US011531965B2

(12) United States Patent
Dhaliwal et al.

(10) Patent No.: US 11,531,965 B2
(45) Date of Patent: Dec. 20, 2022

(54) COLLABORATION PLATFORM FOR FACILITATING CONVERSATIONS BETWEEN USERS

(71) Applicants: Swarn Singh Dhaliwal, Herndon, VA (US); Harjinder Sandhu, Germantown, MD (US)

(72) Inventors: Swarn Singh Dhaliwal, Herndon, VA (US); Harjinder Sandhu, Germantown, MD (US)

( * ) Notice: Subject to any disclaimer, the term of this patent is extended or adjusted under 35 U.S.C. 154(b) by 63 days.

(21) Appl. No.: 16/920,326

(22) Filed: Jul. 2, 2020

(65) Prior Publication Data

US 2021/0133681 A1    May 6, 2021

Related U.S. Application Data

(60) Provisional application No. 62/858,847, filed on Jun. 7, 2019.

(51) Int. Cl.
| | |
|---|---|
| *G06Q 10/10* | (2012.01) |
| *H04L 51/04* | (2022.01) |
| *H04L 65/403* | (2022.01) |
| *H04L 12/18* | (2006.01) |
| *H04L 51/212* | (2022.01) |

(52) U.S. Cl.
CPC ......... *G06Q 10/101* (2013.01); *G06Q 10/103* (2013.01); *H04L 12/1822* (2013.01); *H04L 51/04* (2013.01); *H04L 51/212* (2022.05); *H04L 65/403* (2013.01)

(58) Field of Classification Search
CPC .............. G06Q 10/101; G06Q 10/103; H04L 12/1822; H04L 51/04; H04L 51/12; H04L 65/403; H04L 65/4015
See application file for complete search history.

(56) References Cited

U.S. PATENT DOCUMENTS

| | | | |
|---|---|---|---|
| 7,051,072 B2 | 5/2006 | Stewart et al. | |
| 7,360,164 B2 | 4/2008 | Bjoernsen et al. | |
| 7,689,655 B2 | 3/2010 | Hewitt et al. | |
| 10,554,426 B2 | 2/2020 | Ghods et al. | |
| 2017/0263107 A1* | 9/2017 | Doyle | G08B 25/016 |
| 2018/0367478 A1* | 12/2018 | Desjardins | H04L 51/04 |
| 2018/0367484 A1* | 12/2018 | Rodriguez | G06Q 10/101 |

FOREIGN PATENT DOCUMENTS

WO    WO2002019097 A1    3/2002

* cited by examiner

*Primary Examiner* — Michael A Keller

(57) ABSTRACT

Disclosed herein is a collaboration platform for facilitating conversations between users. The collaboration platform includes a communication device configured for transmitting a content creating interface to a plurality of user devices associated with a plurality of users, receiving content information through the content creating interface from at least one user device, receiving user information associated with a user from a user device and transmitting at least one of an update and a conversational content corresponding to the update to the user device. The collaboration platform includes a processing device configured for generating the conversational content associated with at least one context, generating at least one update corresponding to the conversational content, analyzing the user information, determining a conversation scope associated with the user, and identifying the update of at least one update. The collaboration platform includes a storage device configured for storing the conversational content.

17 Claims, 31 Drawing Sheets

TheDoc (46 ▽)  ☆ 0 Follows 👍 0 Likes  👥 Admin Services
💻 10/14/18, 7:10PM   2 Views
Lots of bug fixes, some of them critical. Lets get that UserGuide Done.

3 of 3   More Less Some   Mark All Read   0 Unread Comments/Replies 6 Reply to 3 Comment

TheDoc C1   👍 0 Likes   We are almost there. Good times ahead
10/15/18, 11:10AM   2 Views
3 Replies   Hide   Mark All Read ↩ Unread replies

- Deepa (R1)   👍 0 Likes   absolutely!
  10/15/18, 11:46AM   2 Views
- Deepa (R2)   👍 0 Likes   I am working on the guide and I am enjoying it.
  10/19/18, 5:31PM   1 View
- TheDoc (R3)   👍 0 Likes   That is awesome
  10/19/18, 5:34PM   1 View Add your reply here...

Deepa C2   👍 0 Likes   TheDoe, I agree with you on C1
10/19/18, 5:35PM   1 View
2 Replies   Hide   Mark All Read ↩ Unread replies

- TheDoc (R1)   👍 0 Likes   We are going to have the awesome app, awesome user guide. The best part is all made with love.
  10/19/18, 5:36PM   1 View
- TheDoc (R2)   👍 0 Likes   That is what make this good
  10/19/18, 5:36PM   1 View Add your reply here...

Deepa C3   👍 0 Likes   The guide should be ready review by tomorrow evening.
10/19/18, 5:37PM   1 View
1 Replies   Hide   Mark All Read ↩ Unread replies

- TheDoc (R1)   👍 1 Like   🙏 That will be very cool
  10/19/18, 5:36PM   1 View Add your reply here...

Add your reply here...

← Home > Collaborations > Admin Services > Post and Updates

Share your updates and ideas here...

Dhaliwal (51★)  ☆ 0 Follows  👍 0 Likes
10/12/18, 9:22AM  2 Views

Good morning again! The weekend is here. Looking forward to finishing up the UserGuide and releasing this baby into the wild.

Add your comment here...

Dhaliwal (51★)  ☆ 0 Follows  👍 0 Likes
10/9/18, 8:56AM  2 Views

Good morning Team. Hope every one had relaxing day yesterday. Let's try to finish the UserGuide this week so that we can start selling this thing.

Add your comment here...

| | Share your updates and ideas here... | x |
|---|---|---|

TheDoc (46♦) ★ 0 Follows 👍 0 Likes 👤 Admin Services
📍 10/1/18, 9:09AM  2 Views

Good morning everyone. We fixed some critical bugs this weekend. In addition improved from user Experience related functionality.
1 of 1   More Less Some  Mark All Read 0 Unread Comments/Replies 2 Replies to 1 Comment

*Display only this conversation*

TheDoc... C1        👍 0 Likes    Chak de collabplace
10/1/18, 6:08PM    2 Views
2 Replies  Hide  Mark All Read TheDoc R1      👍 0 Likes    How's going DocJr
    10/1/18, 6:09PM    2 Views
    TheDoc R2      👍 0 Likes    Doing great
    10/1/18, 7:42PM    2 Views Add your reply here...

Add your comment here...

TheDoc (46♦) ★ 0 Follows 👍 0 Likes 👤 Admin Services
📍 9/28/18, 4:59AM  2 Views

How is the Collabplace German Town Campus doing? Once we finish the documentation, lets start talking to people.
3 of 3   More Less Some  Mark All Read 0 Unread Comments/Replies TheDoc C1        👍 0 Likes    While I was doing this, I discovered an issue. If
9/28/18, 5:00PM    2 Views    the post you are creating is a few lines long. A
                                                                   couple scrollbar is being cause Not goog user
                                                                   experience.

TheDoc... C2        👍 0 Likes    Cool
9/28/18, 8:57PM    2 Views

TheDoc... C3        👍 0 Likes    Hello
9/28/18, 8:52PM    2 Views

TheDoc (46♦) ★ 1 Follow 👍 0 Likes 👤 Admin Services
📍 9/17/18, 9:02AM  2 Views

Good morning everyone Cloudy outside. Means more time CR Chak De CP
1 of 1   More Less Some  Mark All Read 0 Unread Comments/Replies  1 Reply to 1 Comment

DocJr (14 ♦)  ☆ 0 Follows  👍 0 Likes
💬 5/10/19, 5:13PM  2 Views
Email Import feature
1 of 1   More Less Some   Mark All Read   0 Unread Comments/Replies 📧

DocJr  C1    👍 0 Likes
5/10/19, 5:16PM  ↩ 2 Views
Subject: Fwd: Color Run on May 17<sup>th</sup>
From   : Deepak Sidhu
Date    : Fri, 10 May 2019 17:1639 -0400

_____ Forwarded message _____
From: KINGSVIEW MIDDLE SCHOOL <email@blackboard.com>     Imported Email
Date: Fri, May 10, 2019 at 1:42PM
Subject: Color Run on May 17th
To: <email@abcd.com>

A message from KINGSVIEW MIDDLE SCHOOL

Kingsview Color Run

What? Color Run is a fun run combining physical education with fun as student runners/walkers are splashed with different colors at six different stations around the run/walk course with only two rules:

1. Start in white and 2. Finish in color!

Please click on the link to submit a waiver for your child:
https://kingsviewptsa.membersshiptookit.com/login?r=%FOpen_Forms All students MUST return a waiver. Parents must create an account in order to complete the waiver form.

This e-mail has been sent to you by KINGSVIEW MIDDLE SCHOOL. To maximize their communication with you, you may be receiving this e-mail in addition to a phone call with the same message. If you no longer wish to receive email notification from KINGSVIEW MIDDLE SCHOOL, please click here to unsubscribe.

To view the KINGSVIEW MIDDLE SCHOOL privacy policy, please click here.

DocJr  C2    👍 0 Likes    Thanks for sharing the email      Conversation on imported email
5/10/19, 5:27PM  ↩ 0 Views

[ COMMENT ]

FIG. 24

Home > Collaborations > Admin Services > Documents

Manage Files and Documents

2500

Document Detail

VIEW ATTIC

Search

Folders & Documents — Last updated: 9/15/18, 9:59AM By DocJr

☐ Allow Sharing    Delete    Discuss    Download    View

Admin Services

- Hierarchical_for_CollabPlace.docx
- Statement of Expenditure
- Utilization Certificate.jpg 9/15/18, 9:59PM | 18 KB | DocJr

Initiate Check Out

File Name: Hierarchical_for_Colla    File Tags: Type file tag, press

Notes
type file notes, press enter to add

Show Version History    Show Activity History    View Notes

Notes

| Note | Author | Date |
|---|---|---|
| No Results | | |

| Members | | | | |
|---|---|---|---|---|
| ▽ Email ✕ | ▽ Name ✕ | ▽ Org Name ✕ | INVITE MEMBERS | PENDING INVITATIONS |
| Email | Nick Name | Name | Org Name | Activation Status |
| email@abcd.com | Deepa | Deepak Sidhu | GADVASU | Active ✎ |
| info@abcd.com | Navjosh Sandhu | | GADVASU | Active ✎ |
| xyz@abcd.com | Jaskirat | Jaskirat Sandhu | GADVASU | Active ✎ |

Pending Invitations                    X

User who have been sent an invitation to join your organization

| Email | Org | Invitation Sent | Reminder Sent | Reminder Count | | |
|---|---|---|---|---|---|---|
| gurdialsidhu@gmail.com | Affiliated College: Khalsa College of Veterinary & Animal Sciences | 9/9/18 | 1/28/19 | 1 | Resend ⏎ | Delete 🗑 |

COLLABORATION PLATFORM FOR FACILITATING CONVERSATIONS BETWEEN USERS

TECHNICAL FIELD

Generally, the present disclosure relates to the field of data processing. More specifically, the present disclosure relates to a collaboration platform for facilitating conversations between users.

BACKGROUND

Existing techniques for facilitating conversations between users using a collaboration platform are deficient with regard to several aspects. For instance, current technologies do not provide effective, engaging, and effortless dialog that is essential in a business collaboration environment. Furthermore, current technologies do not provide an exchange of information in an efficient, lossless, real-time, persistent, and well-structured manner. Moreover, current technologies do not provide an exchange of information in a context.

Therefore, there is a need for improved collaboration platforms for facilitating conversations between users that may overcome one or more of the above-mentioned problems and/or limitations.

BRIEF SUMMARY

This summary is provided to introduce a selection of concepts in a simplified form, that are further described below in the Detailed Description. This summary is not intended to identify key features or essential features of the claimed subject matter. Nor is this summary intended to be used to limit the claimed subject matter's scope.

Disclosed herein is a collaboration platform for facilitating conversations between users. The collaboration platform may include a communication device configured for transmitting a content creating interface to a plurality of user devices associated with a plurality of users, receiving at least one content information through the content creating interface from at least one user device of the plurality of user devices, receiving user information associated with a user of the plurality of users from a user device of the plurality of user devices and transmitting at least one of an update and at least one conversational content corresponding to the update to the user device of the plurality of user devices. Further, collaboration platform may include a processing device configured for generating at least one conversational content associated with at least one context based on at least one content information, generating at least one update corresponding to at least one conversational content, analyzing the user information, determining a conversation scope associated with the user based on the analyzing and identifying the update of at least one update based on the determination. Further, the collaboration platform may include a storage device configured for storing at least one conversational content.

According to some embodiments, a collaboration platform for facilitating conversations between users is disclosed. The collaboration platform may include a communication device. Further, the communication device may be configured for transmitting a content creating interface to a plurality of user devices associated with a plurality of users, receiving at least one content information through the content creating interface from at least one user device of the plurality of user devices, receiving user information associated with a user of the plurality of users from a user device of the plurality of user devices and transmitting at least one of an update and at least one conversational content corresponding to the update to the user device of the plurality of user devices. Further, the collaboration platform may include a processing device. Further, the processing device may be configured for generating the at least one conversational content associated with at least one context based on the at least one content information and structuring the at least one conversational content in at least one structure, wherein the at least one structure is temporally persistent. Further, the processing device may be configured for generating at least one update corresponding to the at least one conversational content, analyzing the user information, determining a conversation scope associated with the user based on the analyzing and identifying the update of the at least one update based on the determining. Further, the collaboration platform may include a storage device configured for storing the at least one conversational content.

Both the foregoing summary and the following detailed description provide examples and are explanatory only. Accordingly, the foregoing summary and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the applicants. The applicants retain and reserve all rights in their trademarks and copyrights included herein, and grant permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure.

FIG. 7 is a reply user interface related to a collaboration platform, in accordance with exemplary embodiments.

FIG. 19 is an All Updates View user interface related to a collaboration platform, in accordance with exemplary embodiments.

FIG. 20 is a Topic Conversations View user interface related to a collaboration platform, in accordance with exemplary embodiments.

FIG. 21 is a Conversation Detail View user interface related to a collaboration platform, in accordance with exemplary embodiments.

FIG. 24 is a Contextual Email Import user interface related to a collaboration platform, in accordance with exemplary embodiments.

FIG. 25 is a Contextual Document Management user interface related to a collaboration platform, in accordance with exemplary embodiments.

FIG. 26 is a Manage organization view user interface related to a collaboration platform, in accordance with exemplary embodiments.

FIG. 27 is a Manage Organization Members view user interface related to a collaboration platform, in accordance with exemplary embodiments.

FIG. 29 is a Pending Invitations user interface related to a collaboration platform, in accordance with exemplary embodiments.

DETAILED DESCRIPTION

Figure 1:
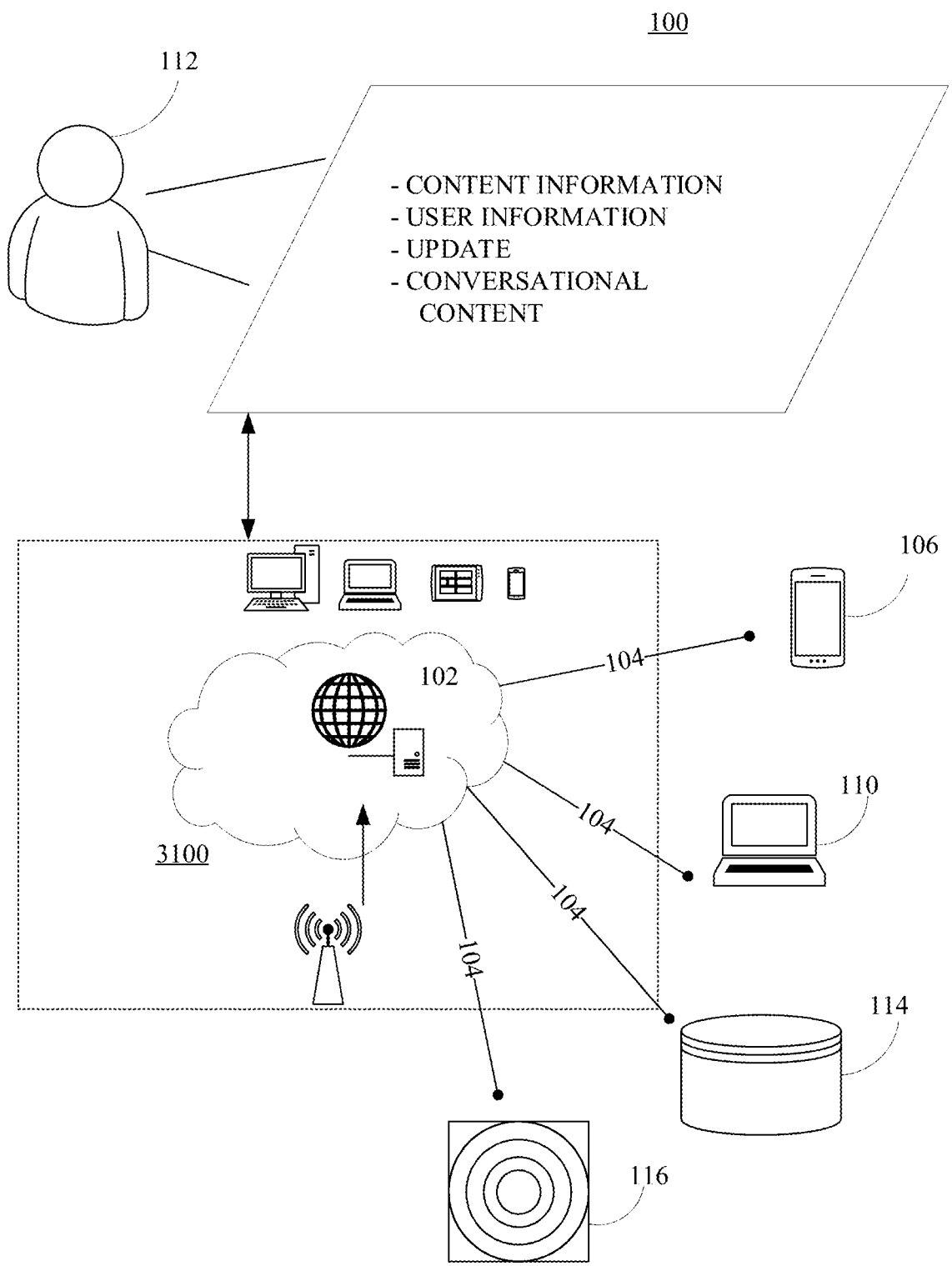
FIG. 1 is an illustration of an online platform consistent with various embodiments of the present disclosure.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and is made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim limitation found herein and/or issuing here from that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present disclosure. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the claims found herein and/or issuing here from. The present disclosure contains headers. It should be understood that these headers are used as references and are not to be construed as limiting upon the subject matter disclosed under the header.

The present disclosure includes many aspects and features. Moreover, while many aspects and features relate to, and are described in the context of collaboration platforms for facilitating conversations between users, embodiments of the present disclosure are not limited to use only in this context.

In general, the method disclosed herein may be performed by one or more computing devices. For example, in some embodiments, the method may be performed by a server computer in communication with one or more client devices over a communication network such as, for example, the Internet. In some other embodiments, the method may be performed by one or more of at least one server computer, at least one client device, at least one network device, at least one sensor, and at least one actuator. Examples of the one or more client devices and/or the server computer may include, a desktop computer, a laptop computer, a tablet computer, a personal digital assistant, a portable electronic device, a wearable computer, a smartphone, an Internet of Things (IoT) device, a smart electrical appliance, a video game console, a rack server, a super-computer, a mainframe computer, mini-computer, micro-computer, a storage server, an application server (e.g. a mail server, a web server, a real-time communication server, an FTP server, a virtual server, a proxy server, a DNS server, etc.), a quantum computer, and so on. Further, one or more client devices and/or the server computer may be configured for executing a software application such as, for example, but not limited to, an operating system (e.g. Windows, Mac OS, Unix, Linux, Android, etc.) in order to provide a user interface (e.g. GUI, touch-screen based interface, voice-based interface, gesture-based interface, etc.) for use by the one or more users and/or a network interface for communicating with other devices over a communication network. Accordingly, the server computer may include a processing device configured for performing data processing tasks such as, for example, but not limited to, analyzing, identifying, determining, generating, transforming, calculating, computing, compressing, decompressing, encrypting, decrypting, scrambling, splitting, merging, interpolating, extrapolating, redacting, anonymizing, encoding and decoding. Further, the server computer may include a communication device configured for communicating with one or more external devices. The one or more external devices may include, for example, but are not limited to, a client device, a third-party database, public database, a private database, and so on. Further, the communication device may be configured for communicating with the one or more external devices over one or more communication channels. Further, the one or more communication channels may include a wireless communication channel and/or a wired communication channel. Accordingly, the communication device may be configured for performing one or more of transmitting and receiving of information in electronic form. Further, the server computer may include a storage device configured for performing data storage and/or data retrieval operations. In general, the storage device may be configured for providing reliable storage of digital information. Accordingly, in some embodiments, the storage device may be based on technologies such as, but not limited to, data compression, data backup, data redundancy, deduplication, error correction, data fingerprinting, role-based access control, and so on.

Further, one or more steps of the method disclosed herein may be initiated, maintained, controlled and/or terminated based on a control input received from one or more devices operated by one or more users such as, for example, but not limited to, an end-user, an admin, a service provider, a service consumer, an agent, a broker and a representative thereof. Further, the user as defined herein may refer to a human, an animal, or an artificially intelligent being in any state of existence, unless stated otherwise, elsewhere in the present disclosure. Further, in some embodiments, the one or more users may be required to successfully perform authentication in order for the control input to be effective. In general, a user of the one or more users may perform authentication based on the possession of a secret human-readable secret data (e.g. username, password, passphrase, PIN, secret question, secret answer, etc.) and/or possession of a machine-readable secret data (e.g. encryption key, decryption key, bar codes, etc.) and/or possession of one or more embodied characteristics unique to the user (e.g. biometric variables such as, but not limited to, fingerprint, palm-print, voice characteristics, behavioral characteristics, facial features, iris pattern, heart rate variability, evoked potentials, brain waves, and so on) and/or possession of a unique device (e.g. a device with a unique physical and/or chemical and/or biological characteristic, a hardware device with a unique serial number, a network device with a unique IP/MAC address, a telephone with a unique phone number, a smartcard with an authentication token stored thereupon, etc.). Accordingly, the one or more steps of the method may include communicating (e.g. transmitting and/or receiving) with one or more sensor devices and/or one or more actuators in order to perform authentication. For example, the one or more steps may include receiving, using the communication device, the secret human-readable data from an input device such as, for example, a keyboard, a keypad, a touch-screen, a microphone, a camera and so on. Likewise, the one or more steps may include receiving, using the communication device, the one or more embodied characteristics from one or more biometric sensors.

Further, one or more steps of the method may be automatically initiated, maintained, and/or terminated based on one or more predefined conditions. In an instance, the one or more predefined conditions may be based on one or more contextual variables. In general, the one or more contextual variables may represent a condition relevant to the performance of the one or more steps of the method. The one or more contextual variables may include, for example, but are not limited to, location, time, identity of a user associated with a device (e.g. the server computer, a client device, etc.) corresponding to the performance of the one or more steps, environmental variables (e.g. temperature, humidity, pressure, wind speed, lighting, sound, etc.) associated with a device corresponding to the performance of the one or more steps, physical state and/or physiological state and/or psychological state of the user, physical state (e.g. motion, direction of motion, orientation, speed, velocity, acceleration, trajectory, etc.) of the device corresponding to the performance of the one or more steps and/or semantic content of data associated with the one or more users. Accordingly, the one or more steps may include communicating with one or more sensors and/or one or more actuators associated with the one or more contextual variables. For example, the one or more sensors may include, but are not limited to, a timing device (e.g. a real-time clock), a location sensor (e.g. a GPS receiver, a GLONASS receiver, a GLONASS-K2 receiver, an indoor location sensor, etc.), a biometric sensor (e.g. a fingerprint sensor), an environmental variable sensor (e.g. temperature sensor, humidity sensor, pressure sensor, etc.) and a device state sensor (e.g. a power sensor, a voltage/current sensor, a switch-state sensor, a usage sensor, etc. associated with the device corresponding to performance of the or more steps).

Further, the one or more steps of the method may be performed one or more number of times. Additionally, the one or more steps may be performed in any order other than as exemplarily disclosed herein, unless explicitly stated otherwise, elsewhere in the present disclosure. Further, two or more steps of the one or more steps may, in some embodiments, be simultaneously performed, at least in part. Further, in some embodiments, there may be one or more time gaps between performance of any two steps of the one or more steps.

Further, in some embodiments, the one or more predefined conditions may be specified by the one or more users. Accordingly, the one or more steps may include receiving, using the communication device, the one or more predefined conditions from one or more devices operated by the one or more users. Further, the one or more predefined conditions may be stored in the storage device. Alternatively, and/or additionally, in some embodiments, the one or more predefined conditions may be automatically determined, using the processing device, based on historical data corresponding to performance of the one or more steps. For example, the historical data may be collected, using the storage device, from a plurality of instances of performance of the method. Such historical data may include performance actions (e.g. initiating, maintaining, interrupting, terminating, etc.) of the one or more steps and/or the one or more contextual variables associated therewith. Further, machine learning may be performed on the historical data in order to determine the one or more predefined conditions. For instance, machine learning on the historical data may determine a correlation between one or more contextual variables and performance of the one or more steps of the method. Accordingly, the one or more predefined conditions may be generated, using the processing device, based on the correlation.

Further, one or more steps of the method may be performed at one or more spatial locations. For instance, the method may be performed by a plurality of devices interconnected through a communication network. Accordingly, in an example, one or more steps of the method may be performed by a server computer. Similarly, one or more steps of the method may be performed by a client computer. Likewise, one or more steps of the method may be performed by an intermediate entity such as, for example, a proxy server. For instance, one or more steps of the method may be performed in a distributed fashion across the plurality of devices in order to meet one or more objectives. For example, one objective may be to provide load balancing between two or more devices. Another objective may be to restrict a location of one or more of an input data, an output data, and any intermediate data therebetween corresponding to one or more steps of the method. For example, in a client-server environment, sensitive data corresponding to a user may not be allowed to be transmitted to the server computer. Accordingly, one or more steps of the method operating on the sensitive data and/or a derivative thereof may be performed at the client device.

Overview

The present disclosure describes a real-time, temporally persistent collaboration platform that is "Web Only" and has a well-defined presentation structure and style that is consistent across various presentation media. A queuing, notification, and peeking mechanism has been developed to allow distraction-free content creation while making updates from other users available in a timely fashion. This mechanism tracks information that allows it to make a determination if the user is currently creating content and displaying a received update would disrupt them. To avoid disruption to the user the developed mechanism adds received updates to a queue and displays an unobtrusive distraction-free notification. An information scoping mechanism has been developed to allow users to control the volume and kinds of updates presented to them in a business collaboration environment. This mechanism implements granular control of information presentation and provides four information scopes including:
  1. At-A-Glance View: All updates displayed in a summary format
  2. Conversation Detail View: Only updates related to a single conversation displayed in a detailed structured conversation format.
  3. Topic Conversations View: All updates about a topic a user is collaborating on displayed in a detailed structured conversation format.
  4. All Updates Views: All updates from any topics that a user is collaborating on displayed in a detailed structured conversation format.

The process of to-do management is integrated into the conversations making them action-oriented and making to-do management contextual. A "Singleton Multimedia Floating Compose Box" has been developed that allows context-aware content creation in structured arbitrarily large business conversation in a web collaboration platform. This invention combines modern web development capabilities including HTML layering, CSS styling, and power of JavaScript to create a mechanism that is multimedia-rich, context-aware, arbitrarily scalable, seamless, and distraction-free. Seamless integration of content shared via email and built-in document storage and management in a contextual manner provides powerful collaboration capabilities. Hierarchical organization structure and cross-organizational team composition allow efficient, focused, and secure collaboration making cross-organizational joint projects a reality. This platform obviates the need for having to deploy, security patching, and version updating native applications. The platform allows creating business conversations that:
  1. are available anywhere, and anytime
  2. always happen in a context
  3. allow contextual responsibility assignment and work performance
  4. have a well-defined structure and presentation format that is consistent across all devices 5. provide easy linking among elements of a conversation as well among elements of different conversations across space and time.
6. provide pervasive, contextual navigation for effective dialog and work performance
7. enable quick replying to an update
8. queue updates to prevent disruption
9. apply queued updates to the conversation view and empty the queue.
10. and navigate to a queued update in the conversation after the updates have been applied and updates queue emptied.

According to some embodiments, the present disclosure is related to a collaboration platform that addresses the shortcomings of the currently available communication tools thus making contextual, well-structured, consistent across devices, and conversational collaboration a reality. Distraction-free content creation along with timely receipt of updates from other collaborators is essential in business collaboration. We have developed a queuing, notification, and peeking mechanism to allow a user to receive updates from other users without being disturbed while in the middle of content creation. Scoping of information presentation in a business collaboration environment is essential to meet the information consumption needs of different groups of users. To be effective, the scoping changes needs to be user-controllable, effortless, and instantaneous. The same information contained in different scoped views must stay synchronized at all times leading to seamless transition among scopes. This present disclosure provides the ability to easily manage to-dos from within and during a conversation making the conversation action-oriented and to-do management contextual. It is essential for business conversations to be arbitrarily scalable. This invention employs a "Singleton Multimedia Floating Compose Box" to allow the creation of in-place content in a scalable fashion. Existing information-sharing media such as email can and should be used in a synergistic manner with other information sharing and business collaboration applications. For this synergy to be most useful, merging of email into the collaborative business conversation must happen in a contextual manner and at the most apposite place within a large conversation. Sharing of documents in a structured format and contextual environment allows efficient creation of intellectual content in a secure and collaborative manner without the risks of security and intellectual property theft associated with local storage of documents. A device-agnostic, cloud-powered, contextual, and web-only document storage and sharing platform have been developed that allows document collaboration in real-time as well as temporally persistent manner There is a need for hierarchical and cross-organizational team composition to mirror the hierarchical organizational structures and cross-organization collaboration needs. A platform to allow "Web Only" real-time and temporally persistent collaboration has been developed that addresses the described requirements.

A Realtime and Temporally Persistent Web conversation allows members of a collaborating team to share information that uses "Only a Web Browser" for delivery and presentation of shared information. The information-sharing happens not only in real-time for team members that are online but also in a temporally persistent fashion for team members who come online at a later time. In order for the information being shared to become an effective dialog among the team members, it is presented in a well-defined structure that is consistent regardless of whether the information is being presented in real-time or in a temporally persistent manner.

The definition of the conversation structure and its temporal consistency is crucial to the effectiveness of the dialog among the collaborating team members. The graphical implementation of a structural conversation provides a set of controls that are presented to the user in a "minimally rich" manner They are minimal so as not to distract the user from their central mission of creating conversational content, but they are rich so as to allow the creation of structured, highly contextual, and linked content. The ability to effortlessly create "navigable links" among structural elements of a conversation allows composing of an immersive and contextually linked dialog that is so essential for meaningful collaboration. "Cross-conversational navigable linking" allows referencing and easily accessing previously created conversational content that happens to be relevant in the current context. This not only saves time and effort but also provides access to the previously created intellectual property in a contextual manner. In addition, the effectiveness of a conversation is enhanced by effortlessly creating rich web content with embedded multimedia and hyperlinks. Since the content of a conversation is rich, linked, and temporally persistent, it must be "serialized for storage and deserialized for presentation" using a serialization format that will remain consistent over time.

To facilitate distraction-free content creation while allowing receipt of real-time updates in a timely fashion, a capability to queue updates, notify users about them, and display them at an appropriate time has been developed. To accomplish this, a content creation tracking mechanism has been developed that keeps track of whether a user is in the middle of creating content. This tracking mechanism keeps track of several pieces of information about a conversation and the creation of content by a user within the conversation. Using information collected and maintained by this tracking mechanism, the system is able to determine if a user is in the middle of content creation and location of the content creation within the conversation. In structured, large, and complex conversations that are typical of essential business collaboration, the content is created in a context and at a specific location within the conversation. The knowledge of this information is essential in determining if an update can be safely displayed to a user without disturbing the process of content creation. Since the timely display of information received from other users is critical for the collaboration process, the system attempts to display this information as quickly as possible but without causing any disruption to a user's thought process. On receipt of an update, the system analyzes the tracked information to determine if content creation is in progress, and displaying an update will cause a disruption. If a determination is made that displaying the update will not cause any disruption to the content creation, the update is immediately displayed. This can happen if the received update is in the context of where content is being created and its receipt will not only not cause disruption but will also aid in the content creation process. However, if the received update will cause a disruption and is not in the context of where the content is being created, the update is added to a queue of updates, and an unobtrusive, distraction-free notification is displayed. The notification is called a "Peek" and contains information about currently queued updates. As long as there are queued updates the Peek is always visible and displays the count of currently queued updates. The Peek also provides controls that allow a user to quickly preview the queued updates and perform actions on them including quickly replying to an update, applying the updates to the conversation and emptying the queue, and navigating to a specific queued update. For instance, if a user is in the middle of creating content that might take some time, she may choose to preview the received updates and act on them. In this case, the user makes the decision on whether they want to interrupt the content creation process and the system provides them a mechanism to easily accomplish that.

The collaboration information consumption needs of a user are determined by the role she plays within the organization. To meet the varying collaboration information consumption needs of different users and to provide frequency and kind of updates most appropriate for a user, this invention creates four conversational scopes and gives the user flexibility to easily switch among them. Since instantaneous switching among these conversation scopes and uniformity of information presentation is of paramount importance for maintaining conceptual continuity for a user, the information in these scopes is kept synchronized and always up to date. These conversation scopes are described below.

1. At-A-Glance (AAG) View: This is the widest of the conversation scopes and receives updates from all collaborations a user is participating in. The updates are presented in chronological order as they are received with most recently received updates at the top. The main purpose of this view is to enable a user to quickly view their update activity stream in one place so that she can choose to respond/take action on important collaboration tasks. Since the focus of this view is to display as many updates as possible in the limited space, this view shows updates in a very compact format without the conversation structure and controls. However, the update entries in this view provide enough information and controls to navigate to the other views most appropriate to deal with a specific update. With the controls provided in the AAG, a user may quickly respond to an update or navigate to another view for performing a more detailed action.

2. All Updates View: This view displays multiple conversations from all topics a user is collaborating on. The updates in this view are presented in a detailed and structured format with controls to allow a user to view and respond to/act on updates from multiple topics without leaving the view. Each update in this view has controls to easily navigate to the same update in other more focused views including the "Topic Conversations View" and the "Conversation Detail View". This view provides a single place where a user can view all their recent conversations and search on older conversations without having to go to multiple places to access the information thus maintaining conceptual continuity in their thought process.

3. Topic Conversations View: This view displays multiple conversations that are related to a topic and allows a user to participate in multiple conversations from the topic in a single view. The information in this view is also presented in a structured conversational format with action controls that are similar to the "All Updates View". Since this view deals with multiple conversations, it allows a user to start new conversations in addition to participating in existing ones. Since all updates presented in this view are related to a single topic, they have a context that allows a user to easily perform actions requiring the topic information.

4. Conversation Detail View: This is the narrowest of the conversation scopes and displays updates only from a single conversation. This view allows a user to have a focused and distraction-free dialog with the participants without being disturbed by the updates from other conversations. This view presents information about a conversation in a detailed structured format with rich controls for performing various actions required during business collaboration.

The conversation user interface developed by this invention provides various controls in a minimally rich way that allows conversation participants to perform a number of actions including creating to-dos and assigning to-dos, completing to-dos, uploading documents, and managing teams. The system uses a conversation selection strategy that allows the presentation of action controls only when needed thus keeping the conversation interface clean and clutter-free. At any given time, there is at most one active conversation where the action controls are available. The user is able to review information in all other conversations in a clean clutter-free format without being distracted by unnecessary interface controls that remain hidden from the view. A conversation can be easily made active by clicking anywhere within the conversation thus making the action controls available as needed. This not only makes the conversation process action-oriented where users can take actions when they have the most relevant information and context required to perform those actions, it also makes the performance of the actions contextual making the whole process efficient and effortless.

To make the business conversations engaging and immersive, the system must allow the creation of rich content in a conceptual manner. To allow the creation of contextual in-place content for structured arbitrarily large web conversations, a "Singleton Multimedia Compose Box" has been developed by this invention that addresses the shortcomings of presently employed inline comment boxes. The Compose Box contains controls for easily creating textual as well as multimedia-rich content including plain text, embedded emoji, embedded images, attached files, and linked artifacts such as hosted videos, external links as well as internal links. Since this Compose Box is so functionally rich, the creation of a large number of instances will not be scalable. However, to allow contextual in-place rich content creation, the Compose Box must be displayed at the place of insertion of the content. One way to accomplish this would be to create a single instance ("Singleton") of the Compose Box and insert it into the HTML DOM at the point of content insertion. However, in a user interface displaying a very large number of HTML DOM elements, frequent removal, and insertion of the Compose Box creates performance issues resulting in awkward and jerky user interface movements resulting in unpleasant and distracting user experience. To address these competing requirements of the desirability of in-place content creation and user interface smoothness and scalability, a floating singleton multimedia compose box has been developed. Since there is only a single instance of this Compose Box and it floats to the point of content insertion, it is not only highly scalable but also results in the creation of a very smooth and pleasant user experience as no HTML DOM modification is required at the point of content insertion. This invention takes advantage of the well understood Singleton design pattern along with advanced web interface layering and styling capabilities to create a contextual content creation mechanism essential for engaging, distraction-free, and effortless web conversations. The HTML Z-Index rendering is used to float the Compose Box that smoothly glides around without disrupting the underlying user interface. Carefully crafted creative CSS styling is used to create an illusion of seamlessness where the Compose Box appears to be an integral part of the content at the point of insertion thus creating a smooth and pleasant content creation user experience.

A mechanism has been developed to allow the use of web browser-based business conversations and email in a synergistic way. This mechanism allows leveraging the existing email infrastructure and content shared through it for making modern web browser-based business conversations more effective. Because of the ubiquitous availability of email and user familiarity with it, business users often share information using email. This has resulted in the accumulation of intellectual and often highly valuable business information in email threads and archives. Although email allows easy exchange and storage of information, it has many limitations when used as a collaboration platform. These limitations include a lack of information structure and conversation context among others. Shortcomings of email as a collaboration platform has led to the development of modern web browser-based collaboration platforms that allow timely and effortless sharing of business information in a highly structured and contextual conversation format. While these collaboration platforms are becoming increasingly popular, email continues to be used for information sharing and storage. Instead of fighting the use of email for business information exchange and striving for the exclusive use of modern business collaboration platforms for this purpose, it is advantageous to allow the two platforms to coexist and be used synergistically. To facilitate this synergy, a mechanism is needed to allow merging of the information shared via email into an ongoing collaborative business conversation happening in the collaboration platform. To be most useful and easily adoptable, this mechanism must be effortless and allow incremental, granular, and continuous merging of emails into the business conversations as needed. In addition, it is critical that the merging of email information into the business conversation must happen at specific and multiple places within the ongoing dialog being conducted by the members of a collaborating team. The current invention provides such a mechanism that makes synergistic use of email and business collaboration a reality thereby aiding in the adoption of a web-based business collaboration platform by gradually weaning the users away from email use for business information exchange. The system accomplishes this contextual email integration by generating a one-time use unique email id that is associated with an insertion point within the conversation and can be used by the user to forward an email message to. When the user forwards the email to the unique email id, the system transforms the forwarded email message into the conversation format and inserts it at the requested point within the conversation. At this point, the email id becomes invalid and cannot be reused while the information contained in the email message becomes an integral part of the business conversation.

A "Web Browser Only" integrated, seamless, contextual, and structured document storage and sharing functionality has been developed as part of this invention. With this functionality document collaboration always happens in the context of a task-oriented collaborative environment such as a project or another kind of collaboration with the eventual goal of accomplishment of a business-critical function. The system allows the organization of a collection of documents from a context in an arbitrarily complex folder structure that is always kept synchronized among views presented to collaborating team members. The documents in the folder structure can be easily moved around using a drag and drop mechanism allowing flexible organization and reorganization of documents over time. This helps keep large collections of documents manageable by grouping related documents in folders and subfolders. In addition to organizing the documents into folders, a document tagging mechanism allows creating document groups that may span folders and subfolders, and various contexts making document identification, access, and availability easy and convenient. All the documents managed by the platform are automatically versioned and a single versioned copy of a document is kept in cloud storage and consistently made available to collaborators. Document integrity is maintained by preventing concurrent modification by multiple users. In order to make modifications to a document, it must be checked out and downloaded by the team member. After making necessary changes the document must be uploaded back and checked-in before it becomes available for modification by other users. The platform makes this process efficient by providing real-time updates and notifications on document check-in/check-out activity. Any document can be discussed in a contextual well-structured conversation format which is especially important during development and/or modification of business documents that contain information developed through shared understanding and intellectual dialog. The users may also quickly add short notes to a document. These notes allow a convenient way to attach short pieces of information to a document that is displayed in a chronological list format. In addition to version history, the system also maintains check-in/checkout activity history for a document that is also presented in a chronological list format. Each entry in the activity history list contains author, action, date of activity, and a short note describing the purpose of the action. In order to conserve storage and avoid clutter the documents that are no longer needed can be deleted. The platform provides protection against accidental deletion by moving a deleted document to an "attic" area which allows it to be easily restored. In order to permanently remove a document, it must be deleted from the attic.

The functionality developed as part of the present disclosure allows the creation of hierarchical organization structures to mirror the business hierarchies found in the real world. A visual hierarchical organization representation is provided to easily create and alter this structure to meet the needs of organizational changes that often happen in dynamic companies. Controls are provided to easily view and manage members in each organizational unit represented by a level in the organizational hierarchy. The implemented organizational hierarchy mechanism allows the creation of collaboration teams in a hierarchy aware manner thereby allowing enforcement of access and information flow controls dictated by the presence of team members at different hierarchical levels. The information structure created and enforced by organizational hierarchy not only makes the process of team formation efficient but also makes it secure by preventing inadvertent inclusion of members without a need to know into a team. This helps to prevent inadvertent or willful exposure of sensitive and/or proprietary information to users who do not have a need or authorization to know. Arrangement of organization units in a hierarchy allows delegated and efficient management where information managers in a given organizational unit are only responsible for managing members of their own unit. Since access, as well as information, can flow down a hierarchy, managers at a unit can easily send updates to all members of their subordinate units by making Organizational Announcements. This makes sharing of information easy, efficient, and secure.

Business users often need to collaborate with users from other businesses to efficiently accomplish tasks on a shared project. This leads to the need for the creation of Cross-Organization teams to collaborate on joint projects undertaken by otherwise separate organizations. Providing access to and presenting information to members of a cross-organizational team in a seamless and unified way is challenging because it requires a delicate balance between the need to protect as well as expose information to users. The access control mechanisms employed by the system must ensure that proprietary, confidential, and sensitive information is not exposed while allowing the sharing of the information required for accomplishing the tasks needed for the success of the joint project. This invention accomplishes cross-organizational collaboration by allowing the owner of a team to invite external users by using their email addresses. The invited external user may or may not already be a registered user of this collaboration system. If the invited external user already has an account in this collaboration system, they are added to the team and a special indicator is attached to their association with the team that helps to identify them as an external user. The invited external user who does not have an account must sign up to create an account before they can be added to the team. Each organization has its own space for storing information generated by its members. This space for different organizations whose users participate in a cross-organizational team may or may not be co-located. Therefore, the system must recognize that a user is participating in a collaboration whose data is stored in a place that is separate from the user's own organizational space and makes it available to the user in a seamless manner without requiring any special action by the user. The current invention uses a sophisticated content distribution and aggregation strategy to make this happen. In this strategy, each collaboration is associated with a "home" organization which determines the location of data for the collaboration. The collaborators who are members of the host organization have automatic access to the collaboration data. However, the collaborators who are external to the home organization must be recognized at the point of data access and the information must be made available to them from the storage area of the host organization. This requires that the information required to identify the presence of a user in a cross-organization team is kept in a common area and can be used to route requests for information contained in the storage area for various organizations. The current invention accomplishes this by partitioning the data into two categories:

1. Shared data
2. Organization data

The shared category of data contains information that is required to identify, authenticate, and authorize a user and determine her organization affiliation as well as her participation in collaborations as an external user. This data is stored in an area that is common to all organizations managed in the system. The organization category of data contains organization-specific information including conversation data, to-do management data, and document storage and management data. This category of data is stored in an organization-specific area and may or may not be collocated with data from other organizations. Every user request for organization-specific data must first determine the location of the data before the data can be retrieved. A majority of the organization-specific user data requests happen in the context of a collaboration entity that contains information required to determine the location of the data. However, the user must first have access to the collaboration entities before the related data can be retrieved. Since an external user does not automatically have access to the collaboration entities stored in their host organizations, those must be made available to the user so that the context for the follow-up requests can be created. Therefore, the list of collaboration entities for a user includes any entities for her organization that she collaborates on as well as entities hosted in the data space of the organization the user collaborates with as an external user. The latter requires that the information about external collaborations be readily available and stored in the common area.

According to some embodiments, the present disclosure relates generally to "Web Browser Only" business conversations. More specifically, it relates to "Web Browser Only" business conversations uniformly delivered across all devices including desktops, phones, and tablets in real-time as well as a temporally persistent manner. The conversations have a well-defined structure and pervasive interlinking, are synchronized and consistent across devices, allow scoped and distraction-free viewing, facilitate creation and completion of to-dos, always happen in a context, and are arbitrarily scalable. These business conversations along with seamlessly integrated and contextual Document Management, To-do management, and Hierarchical as well as Cross-Organizational Team Composition facilitate essential business collaboration, which is effective, effortless, engaging, private, secure, granular, and scalable.

Further, the present disclosure describes an effective, engaging, and effortless dialog that is so essential in a business collaboration environment, Real time-sharing, and Temporally Persistent availability of information is a must. The ultimate goal of business collaboration is to get work done using communication methods that allow the exchange of information that is efficient, lossless, real-time, persistent, and Well-Structured. This information exchange must form a conversational dialog that must always occur in a Context that allows performing context-sensitive actions and assignments of responsibility to participants so that work can be accomplished in an efficient manner. The information must be presented in a consistent format that looks and feels the same and stays Synchronized across various presentation media including mobile phones, tablets, and various desktop computers. This presentation consistency is a must for removing conceptual impedance that results from the presentation of the same information across disparate media with different presentation styles. For instance, when the same information is presented in a Web Browser on a desktop computer and a native IOS or Android application on a mobile device, a user must create a mental mapping between two presentation formats that consumes part of a user's cognitive capacity which will otherwise be spent on solving business problems. On the other hand, if the information is presented in a "Web Only" format with a well-defined, consistent, and familiar structure on all the devices, the user does not have to deal with the presentation disparity and can focus her energy on the work that is being performed through collaboration. This can not only lead to improved productivity but can also make collaborative work fun resulting in improved workplace morale. The "Web Only" presentation is important as it obviates the need for software installation and updates which must be performed in case of "native" applications. The Web Platform also makes instantaneous, anywhere, and anytime availability of the collaboration functionality a reality as the user never has to install or update software which is the source of so many issues including version conflicts, security vulnerabilities, and space and bandwidth issues on the smaller devices.

Further, the present disclosure describes a Distraction-free collaboration environment during real-time, multi-user, high frequency, and structured web conversations that are highly desirable. During essential communication and information sharing typical of a business collaboration environment, the information must be presented to the users in a structured conversation format. This is especially important when multiple users collaborate, and the conversations can get large and complex. The structureless information sharing quickly becomes chatty and difficult to follow and comprehend. In addition, this collaborative information sharing often happens real-time with a user potentially receiving multiple updates relating to different parts of the same conversation and sometimes relating to an entirely different conversation. During the business collaboration, the information being shared is often highly critical and must be created with great care and intellectual thought requiring distraction free thinking. If a user is disturbed during this essential content creation, valuable user time, and intellectual capital is wasted in recreating the thought context that gets lost because of the caused distraction. Although this distraction-free content creation is important and must be provided, timely receipt of information being shared by other users is also equally important as it may be important feedback into the information creation process. In order to create an effective and efficient collaboration environment, these two competing needs for distraction-free content creation and timely update receipt must be balanced. Therefore, a mechanism is needed that will allow a user in a real-time web conversation to receive timely updates from other users participating in the conversation without disturbing their content creation process. The Scoped Conversations allow effective business collaboration by allowing users to limit the scope of updates they receive while collaborating with a team and often multiple teams. The lack of scoping in conversational information sharing can either overwhelm a user with too much information or make the access to information difficult and cumbersome by allowing access to only a very limited amount of information at a time. The conversation scoping puts a user In-Charge of how they want to access the information in real-time as well as in a temporally persistent manner. The conversation scoping allows a user to control the volume and relevance of updates presented at a given point in time. To be effective, the scoping changes must be instantaneous, seamless, and user-controlled. Since the conversations in a business collaboration often happen Realtime, it is imperative that the same information contained in variably scoped views stays synchronized. In order for scoping to be helpful, the scoping changes must be effortless. The user must be easily able to decide if she wants to have a very focused conversation and therefore only have updates for that conversation presented to her. At times, a user might be interested in multiple simultaneous conversations related to a given topic. She should be easily able to widen her single conversation scope to include updates from multiple related conversations in a seamless manner. This process of scope widening should be as easily reversible so that the user can easily limit the scope of updates she receives. One of the main limitations of the existing web conversation platforms is that a user can only receive updates about a single "topic" into their presentation. These topics are variously referred to as conversation groups or channels etc. In order to view updates from a different topic, the user must switch their current view to that topic thus losing any updates previously being displayed. Although the updates from the previous topic can be switched back to, the process is cumbersome and causes disruption to the thought process. At times, a user might be interested in seeing updates from multiple topics in a single view to keep track of happenings in multiple collaborations she is participating in. It should be possible for a user to adjust their conversation scope such that she can receive, view, and respond to updates from multiple topics in a single unified view without the need to continuously switch back and forth between topics. In addition, the way different users collaborate with others is often determined by the role they play in a business organization. For instance, an engineer or technician might work on a very specialized and highly specific task and will participate in highly focused collaborations. For this kind of user, narrowly scoped conversations will be most useful. On the other end of the spectrum are the users who must manage and therefore collaborate on multiple projects and in extreme cases the entire organization. For these users, a widely scoped conversation view receiving updates from multiple topics will be more useful. There are a number of other user groups with collaboration needs that fall in between these two extremes. Since the collaboration needs of different groups of users require different levels of participation and update activity, a collaboration platform should allow commensurate levels of update activity scoping to meet those needs.

One of the main purposes of business collaboration is responsibility assignment and work performance. The need for documenting various to-dos and their assignment and completion is often discovered during a conversation. Since conversation provides the context for the work performed by these to-dos, the most natural and effortless way to document them is from within and during the conversation. Users participating in the conversation should be able to easily create, assign, and complete to-dos in the context thus making the conversation Action-Oriented and to do management Contextual.

A Scalable structured web conversation consists of multiple elements that allow the creation of an engaging and contextual dialog among the conversation participants. In order to be effective and meaningful, these conversations must be allowed to get arbitrarily large and complex. When participating in such a conversation, the informational context becomes very important and must be easily available to communicate ideas effectively and effortlessly. In order to create content that is required for contributing to the ongoing conversation, the user must not be required to jump around in the user interface. The user interfaces that require users to go to a single place to create content, cannot provide conversation context and create unnecessary conceptual load as the user must either remember the conversation context or jump back to it. Neither of these options is ideal as they disrupt a user's thought process thus militating against effective, efficient, and effortless dialog that is so essential in a collaborative environment. Web-based user interfaces have attempted to deal with this issue by creating the so-called inline commenting mechanisms. Although such mechanisms can be effective in sharing simple, short, passive, and non-essential pieces of information typical of social media discourse, they fall short when business essential information must be shared in real-time in a contextual conversation. These inline commenting mechanisms typically display inline text boxes that are either always visible or become visible on-demand as needed. Either of these options creates a less than desirable user experience as always visible boxes create distracting clutter and on-demand display boxes cause structural movements resulting in distracting confusion while participating in a large structured conversation. Therefore, a web content composition mechanism is needed to allow contextual content creation in a structured arbitrarily large conversations without the shortcomings of presently used mechanisms.

An integrated approach to the provision of various capabilities required for the success of a business collaboration platform is a must. This includes the ability to seamlessly integrate information shared through other existing media such as email as well as built-in capabilities to manage to-dos and documents in a contextual manner Often, in business organizations, there is a competition between the use of email and collaboration applications resulting in an antagonistic relationship thereby causing an either-or usage scenario. Since the ultimate goal of email as well as the collaboration application communication is information sharing, they can and should be used in a synergistic manner complementing each other rather than militating against each other's use. To make this synergy work to its fullest potential, information merging between the two media must be done in a structured and contextual manner creating compelling collaboration experiences. The current invention aims to develop such a mechanism to allow the functionality provided by a structured conversational collaboration to be supplemented and enhanced by reusing rather than recreating the information sharing and collaboration occurring via email. The collaborative conversations happening in a business environment can often get large and complex with a number of sub conversations. To get the most value from the email merging into the business conversation, it must not be arbitrary and must happen at the most appropriate and contextually apposite user-controlled place within an ongoing and potentially large conversation.

Documents are often shared and collaborated on in a business environment. It is crucial for an integrated business collaboration platform to have a robust seamlessly integrated Document Management capability. A number of currently available document storage and sharing platforms require users to install the software in order for them to share documents with other users. These devices installed document sharing applications keep a local copy of the documents which creates a security vulnerability as the important intellectual property may be revealed in case the device becomes compromised. In addition, this requirement of document sharing software installation ties documents to a computer/device and violates the spirit of ubiquitous (anywhere and anytime) collaboration afforded by the web platforms. The need for device-agnostic document collaboration has become increasingly important with the proliferation of portable devices which must be interchangeably used and are frequently carried along during travel. The cyber thieves and other organized entities such as governments frequently target portable storage media to steal trade secrets and other intellectual property of all kinds. The "Web Browser Only" upload and access to shared documents obviates the need for software installation and local storage of documents. This is crucial for confidentiality, integrity, and availability of these documents as they cannot be accessed or modified even if a user's device is compromised but at the same time are accessible anytime, anywhere, or from any device. Without the need to keep a copy of the shared documents on the local storage media, this whole class of problems of intellectual property loss/theft goes away. Realtime, Temporally Persistent, and Contextual Web Document Sharing allows members of a collaborating team to share and concurrently work on documents that use "Only a Web Browser". The document sharing happens not only in real-time for Team members that are online but also in a temporally persistent fashion for Team Members who come online at a later time. In order for the shared documents to be easily accessible to the team members, they are presented in a contextual and well-defined drag and drop managed folder structure which is consistent regardless of whether the sharing is happening in real-time or in a temporally persistent manner. The definition of the document folder structure and its temporal consistency is crucial to the effectiveness and ease of document sharing among the collaborating team members. The ability to have "focused and contextual discussions" on shared documents is essential in a collaborative environment. Often the shared documents must be modified and the document versions resulting from those modifications must be reshared. Therefore, real-time and temporally persistent concurrency control is also a must for shared documents. It is important to distinguish document collaboration from document sharing. Making a document available to multiple users without a context is document sharing. Sharing a document with multiple users in a context is what makes it document collaboration. The context is what makes the creation of intellectual content effective as it aids in creating a shared understanding of the content being developed. The context for a document may consist of a project or another type of collaboration. This context may also include other documents that provide additional meaning to the current document being collaborated on. For instance, during the development of a document, a number of artifacts including textual content, drawings, pictures, and other multimedia from various sources/collaborators may be needed. A contextual collaboration platform makes that easily available and accessible to the document authors making the document development process efficient, effective, and intellectually satisfying. The ability to share ideas in a structured format and making that available in real-time and temporally persistent manner helps create a fertile intellectual environment where innovative ideas may be developed and codified in documents in a truly collaborative fashion.

Businesses often have a hierarchical organizational structure. This hierarchy usually dictates the need and therefore permission to access information created, shared and collaborated on by people at different hierarchical levels. To be effective, a collaboration platform must provide team creation and access enforcement capabilities that mirror the hierarchy of the organization. In addition, user teams must be formed with participants from different organizations to accomplish Cross-Organizational tasks required for the success of the projects jointly undertaken by organizations. The creation of these cross-organizational teams must be effortless and their composition obvious to allow the collaborating parties to share appropriate information in a safe and secure manner. The conversation among members of cross-organizational teams must happen in a seamless manner and be presented in a familiar and consistent structure and format. However, the presence of cross-organizational members in a team must be made obvious by providing visual clues so that the collaborating parties are aware of the team composition and do not inadvertently share company sensitive intellectual property with others who do not have a need to know. None of the collaboration platforms presently in the marketplace provides the aforementioned "Web Only" conversational dialog with a well-structured presentation style that is consistent and synchronized across all presentation media, and action-oriented with seamless to-do and document management. Therefore, the technology described in this patent application has been developed to meet the collaboration needs of the modern, always on the go world. The technology described here has the potential to revolutionize the way people organize their digital life and get their work done through collaboration.

Referring now to figures, FIG. 1 is an illustration of an online platform 100 consistent with various embodiments of the present disclosure. By way of non-limiting example, the online platform 100 to enable collaboration platforms for facilitating conversations between users may be hosted on a centralized server 102, such as, for example, a cloud computing service. The centralized server 102 may communicate with other network entities, such as, for example, a mobile device 106 (such as a smartphone, a laptop, a tablet computer, etc.), other electronic devices 110 (such as desktop computers, server computers, etc.), sensors 116, and databases 114 over a communication network 104, such as, but not limited to, the Internet. Further, users of the online platform 100 may include relevant parties such as, but not limited to, users, subordinate users, administrators, and so on. Accordingly, in some instances, electronic devices operated by the one or more relevant parties may be in communication with the platform 100.

A user 112, such as the one or more relevant parties, may access online platform 100 through a web-based software application or browser. The web-based software application may be embodied as, for example, but not be limited to, a website, a web application, a desktop application, and a mobile application compatible with a computing device 3100.

Figure 2:
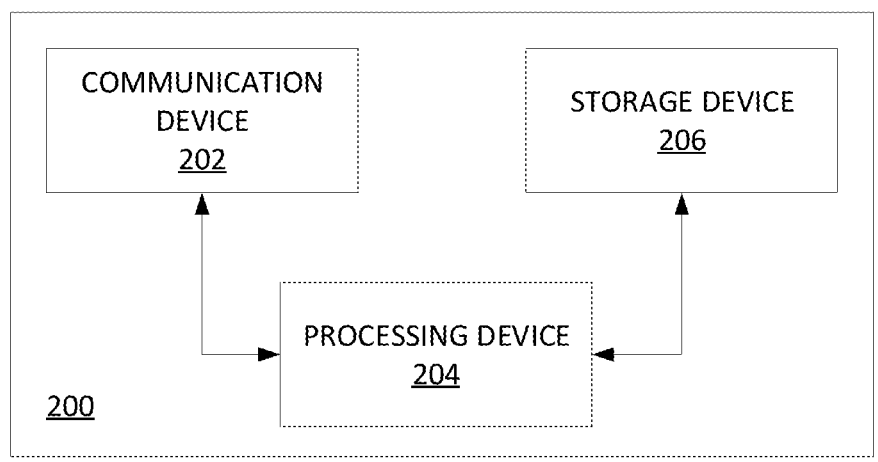
FIG. 2 is a block diagram of a collaboration platform for facilitating conversations between users, in accordance with some embodiments

FIG. 2 is a block diagram of a collaboration platform 200 for facilitating conversations between users, in accordance with some embodiments. Accordingly, the collaboration platform 200 may include a communication device 202, a processing device 204, and a storage device 206.

Further, the communication device 202 may be configured for transmitting a content creating interface to a plurality of user devices (such as the mobile device 106, the electronic devices 110, etc.) associated with a plurality of users (such as the user 112). Further, the content creating interface may allow the plurality of users for creating at least one conversational content. Further, the at least one conversational content may be structured and scalable.

Figure 13:
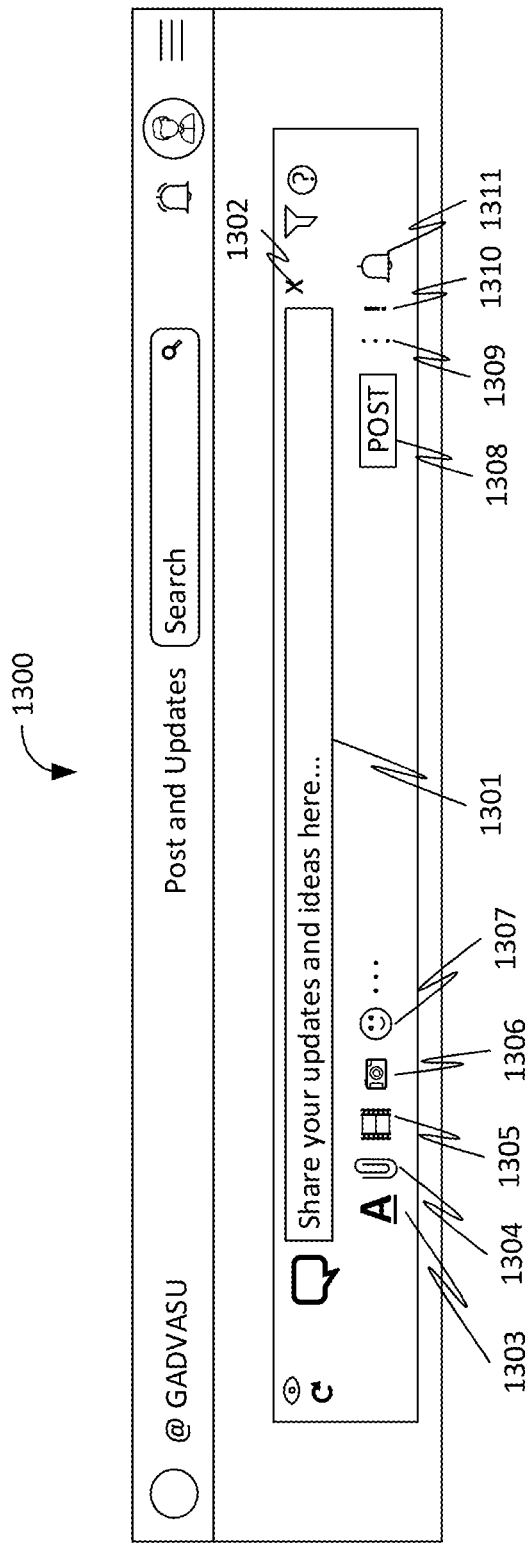
FIG. 13 is a Singleton Compose Box user interface related to a collaboration platform, in accordance with exemplary embodiments.

In some embodiments, the content creating interface may include a singleton compose box user interface 1300, as shown in FIG. 13. Further, the singleton compose box user interface 1300 may include at least one control. Further, the at least one control facilitates creating of the at least one conversational content. Further, the at least one conversational content may be structured and scalable. Further, the at least one control may be used to create a rich multimedia post (the at least one conversational content) and attach various attributes such as an importance and an urgency to the multimedia post. Further, the at least one control, as shown in FIG. 13, may include a Cancel Post Control 1302, a Format Post Control 1303, an Attach File Control 1304, an Attach Video Control 1305, an Attach Document Control 1306, an Input Emoji Control 1307, a More Post Options Control 1309, a Post Importance Control 1310, a Post Urgency Control 1311, etc.

Further, the communication device 202 may be configured for receiving at least one content information through the content creating interface from at least one user device (such as the mobile device 106, the electronic devices 110, etc.) of the plurality of user devices. Further, the at least one content information may be any information received through the content creating interface form the at least one user device. Further, the at least one content information may include any information for the creating of the at least one conversational content. Further, the at least one content information, in an instance, may include metadata of the at least one conversational content.

Further, the communication device 202 may be configured for receiving user information associated with a user of the plurality of users from a user device (such as the mobile device 106, the electronic devices 110, etc.) of the plurality of user devices. Further, the user information may include any information associated with at least one of identification of the user, authentication of the user, authorization of the user, and affiliation of the user.

Further, the communication device 202 may be configured for transmitting at least one of an update and the at least one conversational content corresponding to the update to the user device of the plurality of user devices. Further, the at least one conversational content may include at least one of textual content and a multimedia-rich content. Further, the multimedia-rich content may include plain text, embedded emoji, embedded images, attached files, and linked artifacts such as hosted videos, external links as well as internal links. Further, the at least one conversational content facilitates at least one conversation between the plurality of users in a structured manner and a context. Further, the at least one conversational content, in an instance, may include a post, a comment, a reply, etc. Further, at least one of the comment and the reply may be associated with the post. Further, the post may include a multimedia post. Further, the post, in an instance, may include textual content, multimedia content, etc. Further, the multimedia content, in an instance, may include images, videos, audios, and other documents (Pdf, MS Word and MS Excel, etc.). Further, the update may include any information associated with the at least one conversational content.

Further, the processing device 204 may be configured for generating the at least one conversational content associated with at least one context based on the at least one content information. Further, the at least one context may include at least one of a collaboration group, a collaboration task, a collaboration issue, and a collaboration document.

Further, the processing device 204 may be configured for generating at least one update corresponding to the at least one conversational content.

Further, the processing device 204 may be configured for analyzing the user information.

Further, the processing device 204 may be configured for determining a conversation scope associated with the user based on the analyzing. Further, the conversation scope provides the consumption needs of the user. Further, the consumption need may include a frequency and kind of updates most appropriate for the user. Further, the conversation scope may include an At-A-Glance (AAG) View, an All Updates View, a Topic Conversations View, and a Conversation Detail View.

Further, the processing device 204 may be configured for identifying the update of the at least one update based on the determining.

Further, the storage device 206 may be configured for storing the at least one conversational content.

In some embodiments, the at least one conversational content may include at least one previous conversational content and at least one current conversational content. Further, each of the at least one previous conversational content and the at least one current conversational content may be associated with at least one context. Further, the communication device 202 may be configured for receiving at least one indication associated with at least one of the at least one previous conversational content and the at least one current conversational content from the user device. Further, the processing device 204 may be configured for linking the at least one current conversational content with the at least one previous conversational content based on the at least one indication.

In further embodiments, the processing device 204 may be configured for structuring the at least one conversational content in at least one structure. Further, the at least one structure, in an instance, may include a well-defined presentation structure. Further, the at least one structure may be temporally consistent. Further, the temporal persistence may remove conceptual impedance in the at least one conversational content.

In further embodiments, the communication device 202 may be further configured for receiving at least one device status of the plurality of user devices from at least one device sensor (such as the sensors 116). Further, the at least one device sensor may be configured for generating the at least one device status based on at least one status of the plurality of user devices. Further, the at least one status may include the operational status of the plurality of devices.

Further, the communication device 202 may be configured for transmitting the at least one conversational content to the plurality of user devices based on at least one sharing manner. In some embodiments, the at least one sharing manner may include a real-time manner and a temporally persistent manner. Further, the at least one conversational content may be consistent for at least one of the real-time manner and the temporally persistent manner.

Further, the processing device 204 may be configured for identifying the at least one sharing manner corresponding to the at least one conversational content based on the at least one device status.

Further, the plurality of user devices may be communicatively connectable to the communication device 202 over at least one communication channel (such as the communication network 104). Further, the at least one status may include an online state and an offline state. Further, each user device of the plurality of user devices may transition between the online state and the offline state. Further, a user device of the plurality of user devices may not be communicatively connected to the communication device 202 in the offline state. Further, a user device of the plurality of user devices may be communicatively connected to the communication device 202 in the online state.

In further embodiments, the processing device 204 may be configured for analyzing the at least one content information.

Further, the processing device 204 may be configured for determining at least one content status based on the analyzing of the at least one content information. Further, the at least one content status may include at least one engagement of at least one user for the creation of the at least one conversational content. Further, the at least one engagement may describe that the at least one user may be in the middle of creating the at least one conversational content.

Further, the processing device 204 may be configured for identifying a user device of the plurality of user devices based on the at least one content status. Further, the communication device 202 may be configured for transmitting the at least one update to the user device of the plurality of user devices. Further, the user device may be configured for presenting the at least one update. Further, the presenting of the at least one update may interrupt the receiving of the at least one content information. Further, the interrupt in the receiving may interrupt the creating of the at least one conversational content.

In further embodiments, the processing device 204 may be configured for creating an update queue based on the determining of the at least one content status. Further, the update queue may include the at least one update.

Further, the processing device 204 may be configured for generating at least one notification based on the creating. Further, the communication device 202 may be configured for transmitting the at least one notification to the user device of the plurality of user devices. Further, the user device may be configured for presenting the at least one notification. Further, the presenting of the at least one notification does not interrupt the receiving of the at least one content information.

Figure 9:
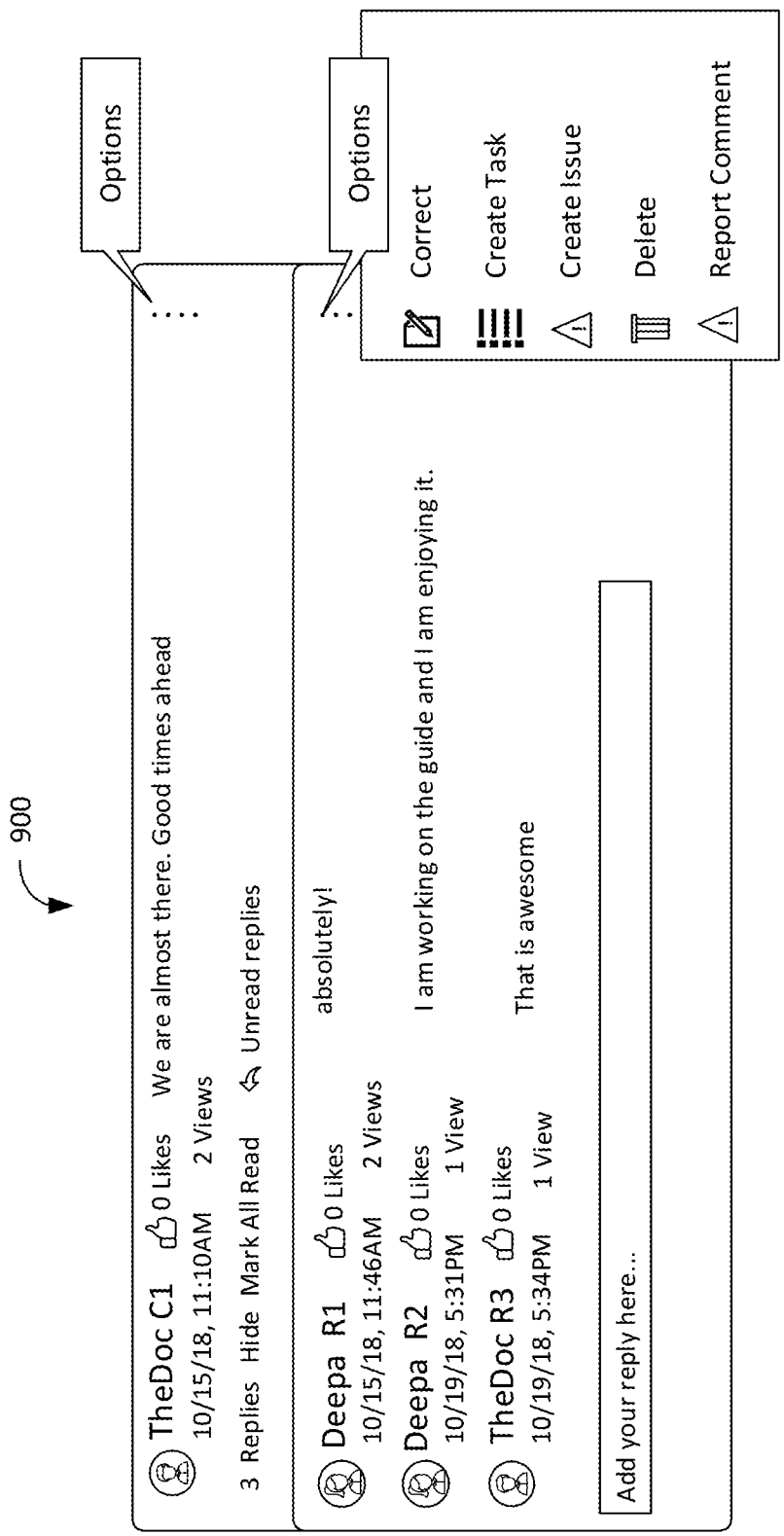
FIG. 9 is a user interface related to a collaboration platform, in accordance with exemplary embodiments.

In further embodiments, the communication device 202 may be configured for transmitting a conversation user interface to the plurality of user devices. Further, the conversation user interface may include a user interface 900, as shown in FIG. 9. Further, the conversation user interface may include at least one posting option control associated with the at least one conversational content. Further, the communication device 202 may be configured for receiving at least one posting option control indication corresponding to the at least one posting option control through the conversation user interface from the at least one user device. Further, the communication device 202 may be configured for transmitting at least one of a discussion, a task, an issue, and an event to the plurality of user devices. Further, the processing device 204 may be configured for identifying the at least one posting option control based on the at least one posting option control indication. Further, the processing device 204 may be configured for performing at least one action on the at least one conversational content based on the at least one posting option control. Further, the processing device 204 may be configured for converting the at least one conversational content to the at least one of the discussion, the task, the issue, and the event based on the performing.

In some embodiments, the at least one conversational content may form the at least one conversation. Further, the communication device 202 may be configured for receiving at least one inserting point indication from the at least one user device.

Further, the communication device 202 may be configured for transmitting a one-time use email ID to the at least one user device.

Further, the communication device 202 may be configured for receiving an email associated with the one-time-use email ID from an external device (such as the mobile device 106, the electronic devices 110, etc.). Further, the email may be associated with the at least one context.

Further, the processing device 204 may be configured for identifying at least one inserting point in the at least one conversation based on the at least one inserting point indication. Further, the at least one inserting point may include at least one location in the at least one conversation.

Further, the processing device 204 may be configured for generating the one-time-use email ID based on the identifying of the at least one inserting point.

Further, the processing device 204 may be configured for processing at least one email information of the email. Further, the at least one email information may be any information associated with the email. Further, the at least one email information may include at least one of a text, an image, a video, an audio, etc.

Further, the processing device 204 may be configured for integrating the at least one email information in the at least one conversation based on the processing.

In further embodiments, the communication device 202 may be configured for receiving at least one document from at least one user device. Further, the at least one document, in an instance, may include a number of artifacts including textual content, drawings, pictures, and other multimedia content.

Further, the communication device 202 may be configured for transmitting the at least one document to the plurality of user devices.

Further, the communication device 202 may be configured for receiving at least one additional information corresponding to the at least one document from a user device of the plurality of user devices. Further, the at least one additional information, in an instance, may be any information associated with the at least one document. Further, the at least one additional information may include at least one of textual content, drawings, pictures, and other multimedia content.

Further, the communication device 202 may be configured for transmitting at least one new document to the plurality of user devices.

Further, the processing device 204 may be configured for performing at least one action on the at least one document based on the at least one additional information.

Further, the processing device 204 may be configured for generating the at least one new document based on the performing.

Further, the processing device 204 may be configured for generating at least one notification based on the performance. Further, the at least one notification may include a time-stamp. Further, the storage device 206 may be configured for storing the at least one notification. Further, the storage device 206 does not store the at least one document and the at least one new document.

In further embodiments, the communication device 202 may be configured for receiving a plurality of information from the plurality of user devices. Further, the plurality of information may be associated with the plurality of users. Further, the plurality of information, in an instance, may include any information associated with at least one of identification of the plurality of users, authentication of the plurality of users, authorization of the plurality of users, association of the plurality of users and affiliation of the plurality of users.

Further, the processing device 204 may be configured for analyzing the plurality of information.

Further, the processing device 204 may be configured for generating at least one organizational unit associated with at least one organization based on the analyzing. Further, the at least one organizational unit may be associated with at least one hierarchical level of an organizational hierarchy. Further, the at least one organizational unit may include at least one user. Further, the at least one user may be associated with the at least one user device.

Further, the processing device 204 may be configured for forming at least one team based on the generating. Further, the at least one team may include the at least one user of the at least one organizational unit. Further, the at least one user may be associated with the at least one hierarchical level.

Further, in an embodiment, the at least one organization may include a first organization and a second organization. Further, the at least one organizational unit may include a first organizational unit and a second organizational unit. Further, the first organizational unit may be associated with the first organization and the second organizational unit may be associated with the second organization.

Further, in an embodiment, the at least one team may include at least one first user of the first organizational unit and at least one second user of the second organizational unit. Further, the at least one first user may be associated with at least one first hierarchical level of the organizational hierarchy and the at least one second user may be associated with at least one second hierarchical level of the organizational hierarchy.

In some embodiments, the at least one organizational unit may include a plurality of organizational units associated with a plurality of hierarchical levels. Further, the plurality of organizational units may include the plurality of users associated with the plurality of user devices. Further, the communication device 202 may be configured for receiving data from a user device of the plurality of user devices associated with a user of the plurality of users. Further, the data, in an instance, may include any information associated with the user. Further, the data, in an instance, may include at least one announcement for the plurality of users from the user. Further, the user may be associated with an organizational unit of the plurality of organizational units. Further, the organizational unit may be associated with a hierarchical level of the plurality of hierarchical levels.

Further, the communication device 202 may be configured for transmitting the data to at least one subordinate user device (such as the mobile device 106, the electronic devices 110, etc.) of the plurality of user devices associated with at least one subordinate user of the plurality of users. Further, the at least one subordinate user may be associated with at least one lower organizational unit of the plurality of organizational units. Further, the processing device 204 may be configured for comparing the plurality of hierarchical levels associated with the plurality of organizational units with the hierarchical level of the organizational unit. Further, the processing device 204 may be configured for identifying the at least one lower organizational unit of the plurality of organizational units based on the comparing. Further, the at least one lower organizational unit may be associated with at least one lower hierarchical level of the plurality of hierarchical levels. Further, the at least one lower organizational unit may include the at least one subordinate user of the plurality of users. Further, the at least one subordinate user may be associated with the at least one subordinate user device of the plurality of user devices. Further, at least one position of the at least one lower hierarchical level may be lower in the organizational hierarchy than a position of the hierarchical level in the organizational hierarchy.

In further embodiments, the processing device 204 may be configured for determining at least one collaboration of the user of the plurality of users based on the analyzing of the user information. Further, the identifying of the update of the at least one update may be based on the at least one collaboration.

Figure 3:
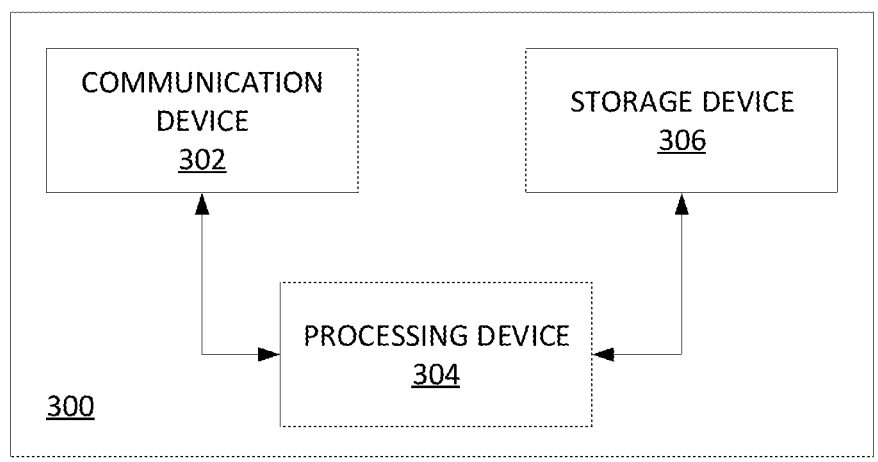
FIG. 3 is a block diagram of a collaboration platform for facilitating conversations between users, in accordance with some embodiments.

FIG. 3 is a block diagram of a collaboration platform 300 for facilitating conversations between users, in accordance with some embodiments. Accordingly, the collaboration platform 300 may include a communication device 302 a processing device 304 and a storage device 306.

Further, the communication device 302 may be configured for transmitting a content creating interface to a plurality of user devices (such as the mobile device 106, the electronic devices 110, etc.) associated with a plurality of users (such as the user 112).

In some embodiments, the content creating interface may include a singleton compose box user interface 1300, as shown in FIG. 13. Further, the singleton compose box user interface 1300 may include at least one control. Further, the at least one control facilitates creating of at least one conversational content. Further, the at least one conversational content may be structured and scalable.

Further, the communication device 302 may be configured for receiving at least one content information through the content creating interface from at least one user device of the plurality of user devices.

Further, the communication device 302 may be configured for receiving user information associated with a user of the plurality of users from a user device of the plurality of user devices.

Further, the communication device 302 may be configured for transmitting at least one of an update and the at least one conversational content corresponding to the update to the user device of the plurality of user devices.

Further, the processing device 304 may be configured for generating the at least one conversational content associated with at least one context based on the at least one content information. Further, at least one context may include at least one of a collaboration group, a collaboration task, a collaboration issue, and a collaboration document.

Further, the processing device 304 may be configured for structuring the at least one conversational content in at least one structure. Further, the at least one structure may be temporally consistent.

Further, the processing device 304 may be configured for generating at least one update corresponding to the at least one conversational content.

Further, the processing device 304 may be configured for analyzing the user information.

Further, the processing device 304 may be configured for determining a conversation scope associated with the user based on the analyzing.

Further, the processing device 304 may be configured for identifying the update of the at least one update based on the determining.

Further, the storage device 306 may be configured for storing the at least one conversational content.

In further embodiments, the processing device 304 may be configured for determining at least one collaboration of the user of the plurality of users based on the analyzing of the user information. Further, the identifying of the update of the at least one update may be based on the at least one collaboration.

Figure 4:
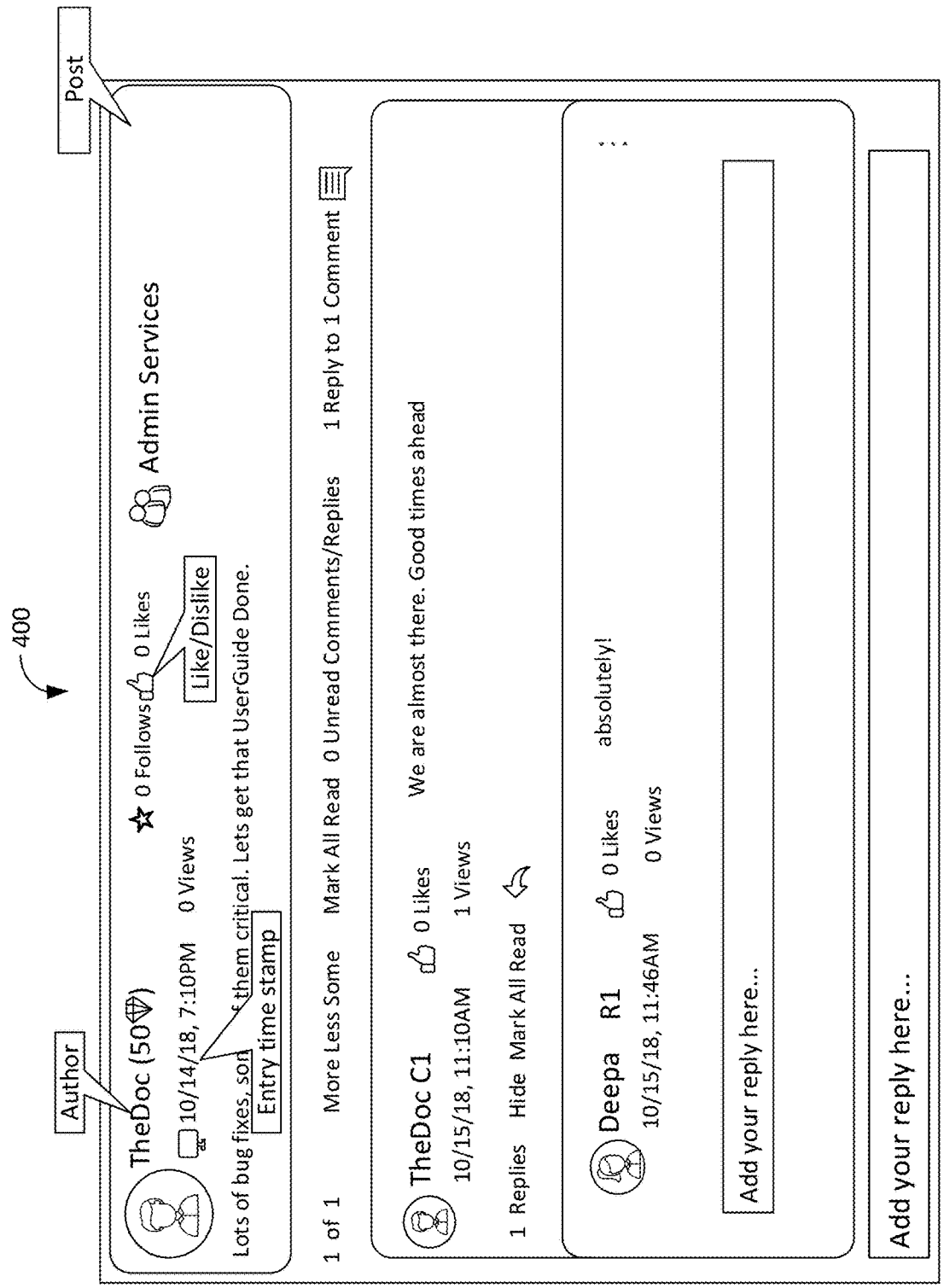
FIG. 4 is a conversation view user interface related to a collaboration platform, in accordance with exemplary embodiments.

FIG. 4 is a conversation view user interface 400 related to a collaboration platform, in accordance with exemplary embodiments. The conversation view user interface 400 may allow a user to create a post. A conversation may be started by creating a post. Further, collaborators may participate in a conversation by adding comments to the post and adding replies to those comments.

Figure 5:
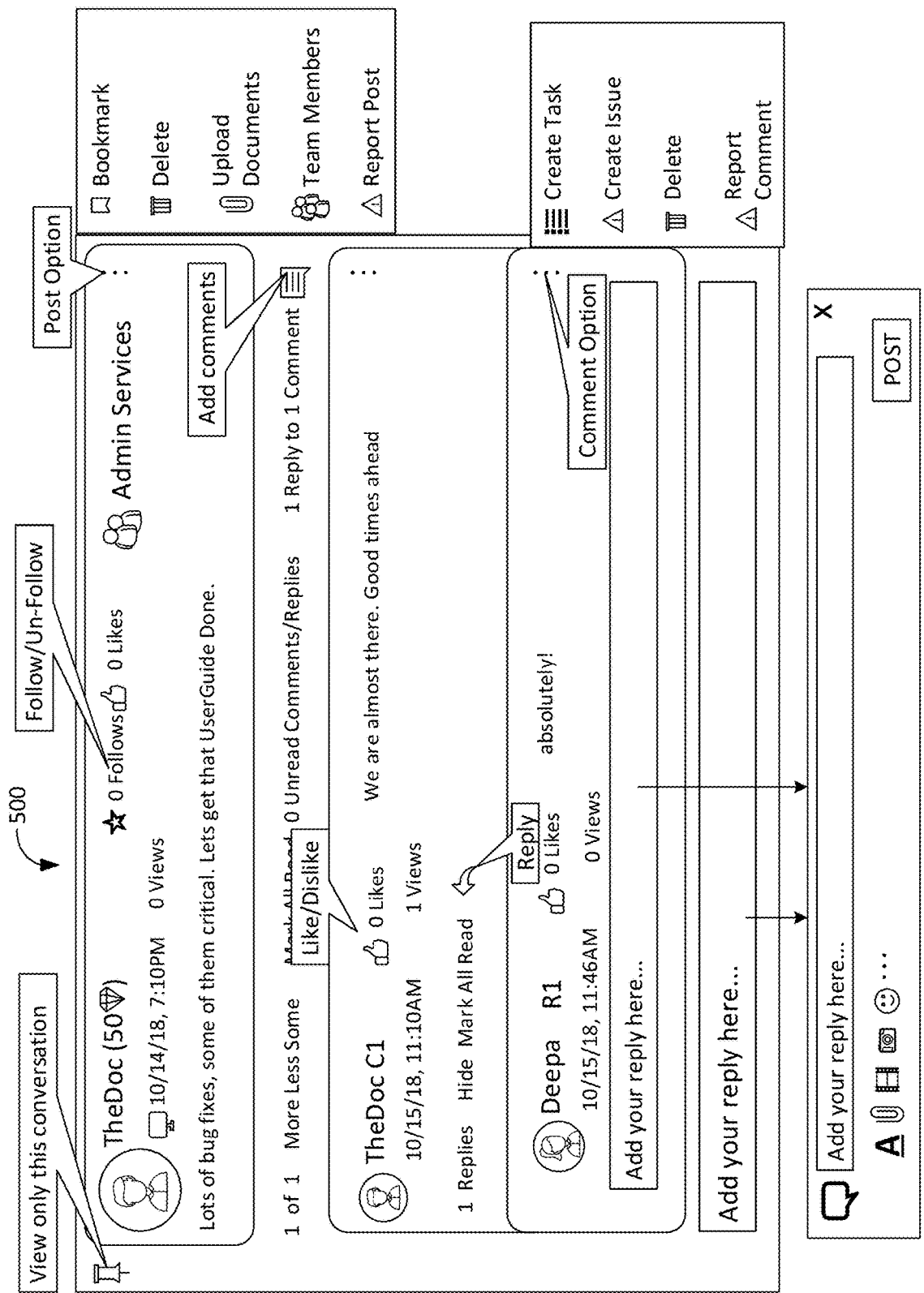
FIG. 5 is a conversation view user interface related to a collaboration platform, in accordance with exemplary embodiments.

FIG. 5 is a conversation view user interface 500 related to a collaboration platform, in accordance with exemplary embodiments. The conversation view user interface 500 may allow a user to create a post. A post usually consists of textual content but may contain multimedia content including images, videos and/or audios, and other documents (Pdf, MS Word and MS Excel, etc.). The conversations are made contextual and relevant by replying to comments and interlinking the replies, comments, and posts. posts, comments, and replies share common as well as unique features. The features shared by posts, comments, and replies are described below followed by unique features of each.

Common Features

Further, each entry in a conversation may include a header that consists of author profile info and time at which the entry was created. The header may also contain a control to like/unlike an entry and displays a number of collaborators who have already viewed the entry. On the right edge of each entry, there may be posting options control which may be made visible by selecting the entry. Posting options control may allow a user to perform various actions on the entry that depends on the type of entry (Post, Comment, and Reply), and author of the entry. Some of these actions may be common to all the entries and are described below. The action specific to entry will be described in the individual entry sections further below. The common posting options allow an entry to be Corrected for content Deleted (by the author of the post or an Organization Admin)

Reported for inappropriate content: The reported posts are referred to organization admin for review who may delete those posts if determined to be inappropriate.

Post Features

In addition to the common features described above, a post may also include controls that allow it to be followed, and shared. The sharing feature may allow a post to be sent to people who are not currently collaborating on the post. The posting options may allow a post to be:

Converted to a Discussion, a Task, an Issue, or an Event.

Bookmarked

Figure 6:
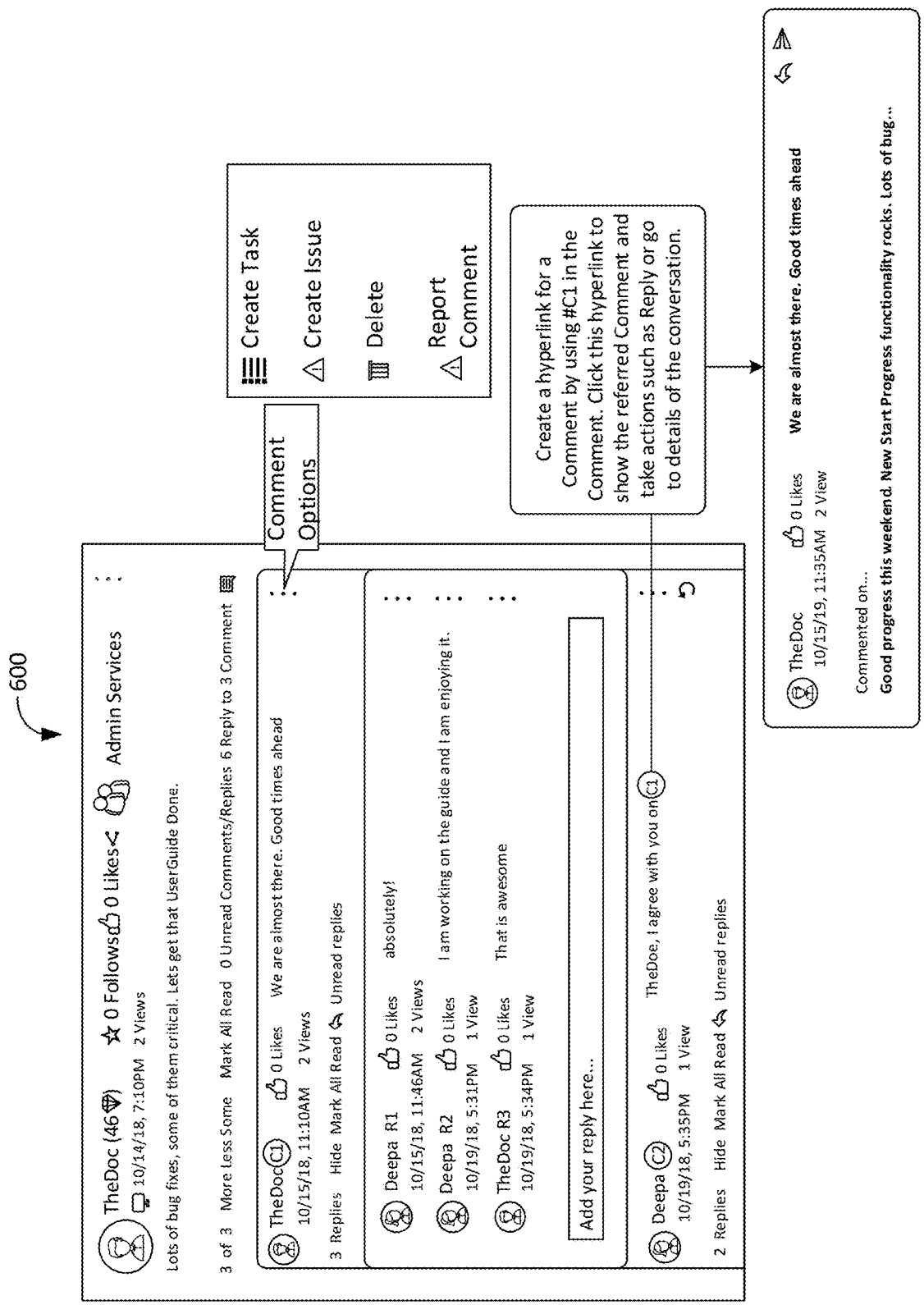
FIG. 6 is a comment user interface related to a collaboration platform, in accordance with exemplary embodiments.

FIG. 6 is a comment user interface 600 related to a collaboration platform, in accordance with exemplary embodiments. A comment may also include a control that allows a user to add replies to the comment. A comment may include a unique identifier within the post that may be indicated by letter 'C' followed by a sequential number e.g. C1, C2, etc. This identifier may allow the comment to be referenced in other comments and replies thus creating a highly linked and contextual conversation structure. To insert a reference to the comment the user may either click on the identifier followed by clicking at the point of insertion or simply type the identifier preceded by # at the point of insertion. After the target entry (Comment/Reply with inserted reference) may be submitted, a link to the referenced comment/reply may be automatically created.

FIG. 7 is a reply user interface 700 related to a collaboration platform, in accordance with exemplary embodiments. Further, the reply may include a unique identifier within the comment that is indicated by letter 'R' followed by a sequential number e.g. R1, R2, R3, etc. This identifier may allow the reply to be referenced in other comments and replies thus creating a highly linked and contextual conversation structure.

Figure 8:
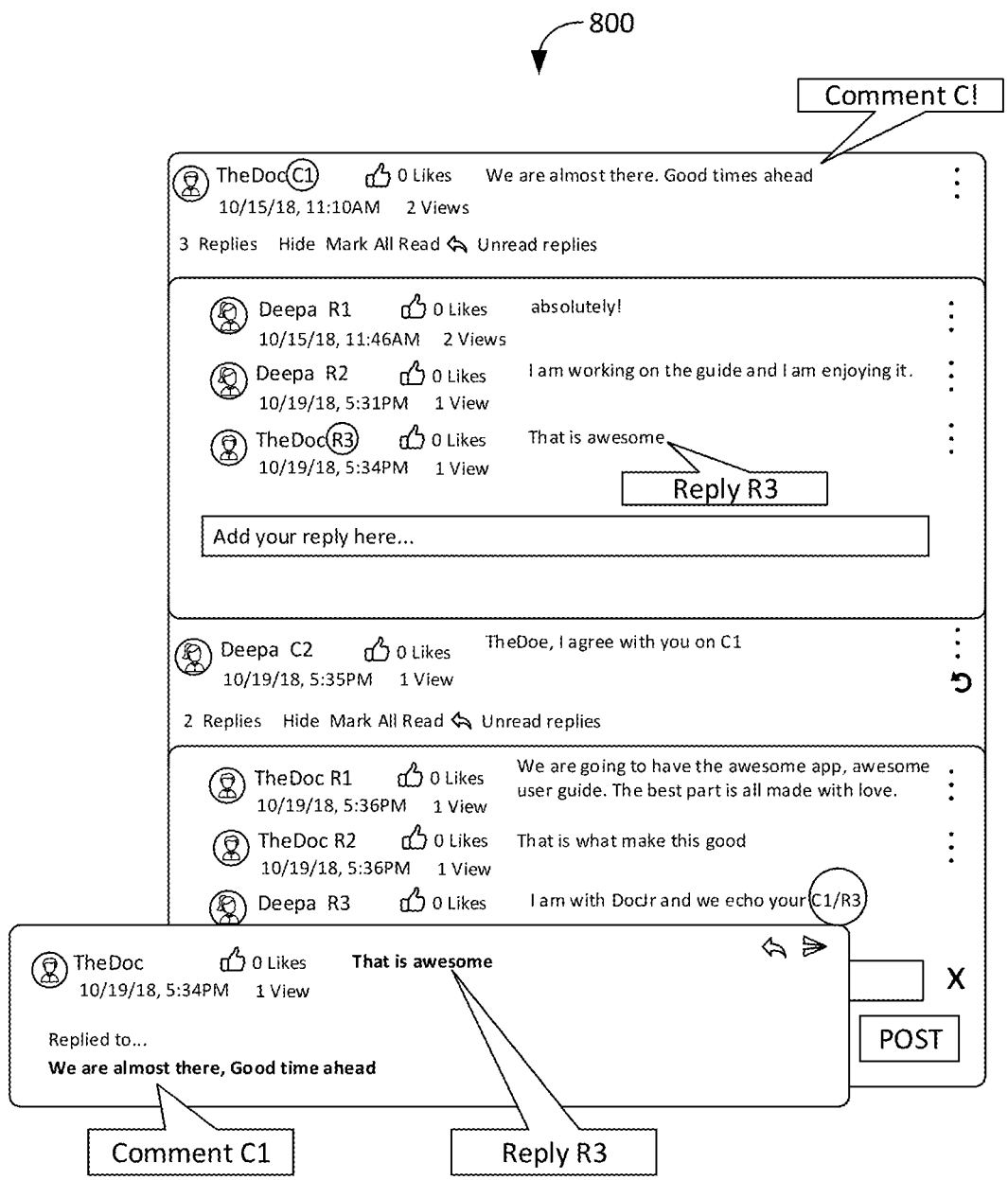
FIG. 8 is a reference user interface related to a collaboration platform, in accordance with exemplary embodiments.

FIG. 8 is a reference user interface 800 related to a collaboration platform, in accordance with exemplary embodiments. To create a reference to a reply the user may either click on the reply identifier followed by clicking at the point of insertion or simply type the identifier preceded by #at the point of insertion. After the target entry (Comment/Reply with inserted reference) may be submitted, a link to the referenced comment/reply may be automatically created.

FIG. 9 is a user interface 900 related to a collaboration platform, in accordance with exemplary embodiments. The user interface 900 illustrates that to reference a reply outside of its parent comment, a reference of the form #Cn/Rm (where n and m are identifier numbers for a Comment and Reply respectively) must be used.

Figure 10:
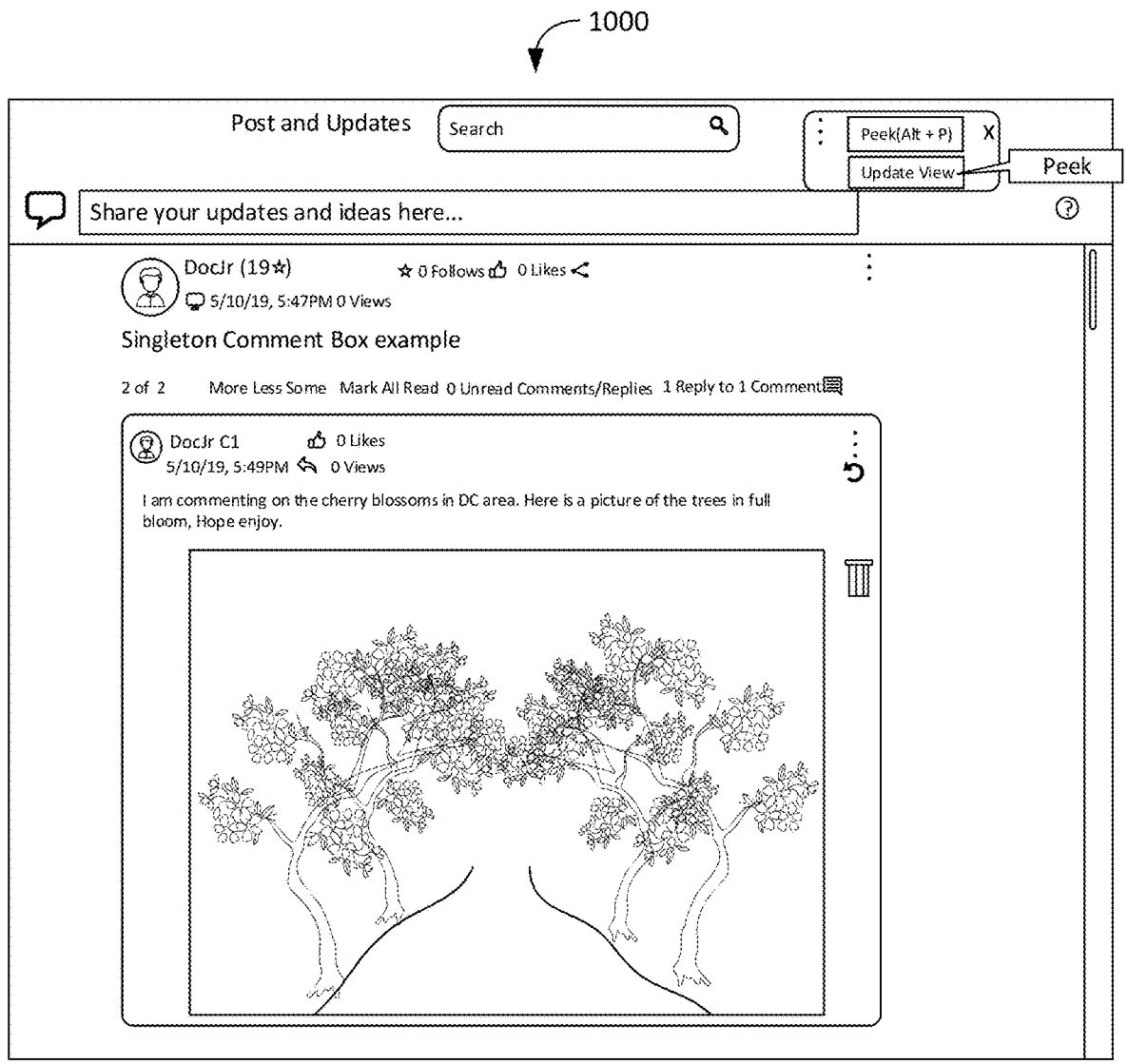
FIG. 10 is a peek notifications user interface related to a collaboration platform, in accordance with exemplary embodiments.

Comment/Reply posting options: The posting options allow a comment/reply to be:
Converted to a Task
Converted to an Issue FIG. 10 is a peek notifications user interface 1000 related to a collaboration platform, in accordance with exemplary embodiments. When a user may be in the process of creating content and displaying an update may disrupt her, the update may be queued, and the user may be informed about it by displaying an unobtrusive but obvious message called a peek.

Figure 11:
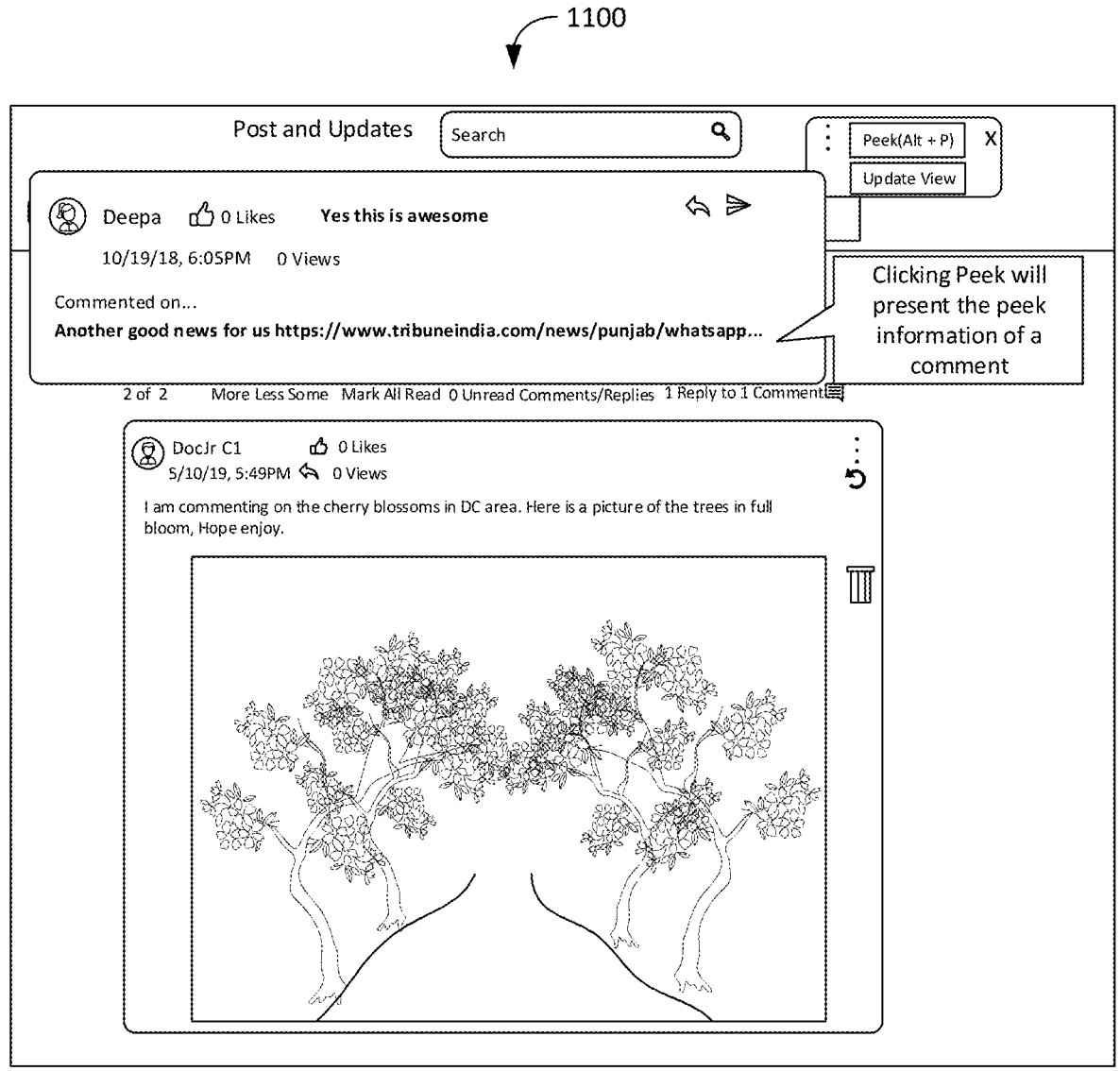
FIG. 11 is a peek updates user interface related to a collaboration platform, in accordance with exemplary embodiments.
Figure 12:
FIG. 12 is an update view user interface related to a collaboration platform, in accordance with exemplary embodiments.

FIG. 11 is a peek updates user interface 1100 related to a collaboration platform, in accordance with exemplary embodiments. A peek may contain information to display a short notification as well as the whole update that caused the peek. The information in the update may be displayed by the peek updates view. FIG. 12 is an update view user interface 1200 related to a collaboration platform, in accordance with exemplary embodiments.

FIG. 13 is a Singleton Compose Box user interface 1300 related to a collaboration platform, in accordance with exemplary embodiments. The singleton compose box may allow the creation of scalable conversations in a contextual manner. The compose box may contain controls to create a rich multimedia post and attach various attributes such as importance and urgency to it.

A top row of the Singleton Compose Box user interface 1300 may be the area of the input control panel that may be always visible. The top row includes:

1. Post Input Box 1301: This input box may be used to create the post. The user can type the text as well as paste text and images in this box.
2. Cancel Post Control 1302: This control allows a user to discard an unsubmitted post.

A bottom row of the Singleton Compose Box user interface 1300 includes a collection of graphic buttons that allow a user to perform various post related functions. The bottom row includes:

3. Format Post Control 1303: Opens a rich text editor that allows the user to create a formatted post and attach file(s).
4. Attach File Control 1304: Opens a rich text editor that allows the user to create a formatted post and attach file(s).
5. Attach Video Control 1305: Allows the user to attach a YouTube video link to the post.
6. Attach Document Control 1306: Allows the user to attach existing documents to the post.
7. Input Emoji Control 1307: Allows users to insert Emoji into the post text.

A bottom row right of the Singleton Compose Box user interface 1300 includes a collection of buttons that allows a user to submit a post as well as add attributes to the post. The bottom row right includes:

8. Post Button 1308: Allows the user to submit the post so that it may be published and becomes visible to other users immediately.
9. More Post Options Control 1309: Allows the user to attach various attributes to the post including designating it as an organization announcement, discussion, announcement, or celebration. Also allows user to link the post to a Collaboration or a Project via 'Link and Post' action.
10. Post Importance Control 1310: Allows the user to mark the post as important. The posts marked as important are displayed with a special indicator to make them prominent.
11. Post Urgency Control 1311: Allows the user to add urgency to a post. The posts can be marked as Normal (default), Urgent, or Critical. Urgent posts cause an email notification to be sent to all the collaborators of the post. Critical posts result in text messages to the collaborators. The collaborators who have not specified a mobile phone number receive emails for Critical posts.

Figure 14:
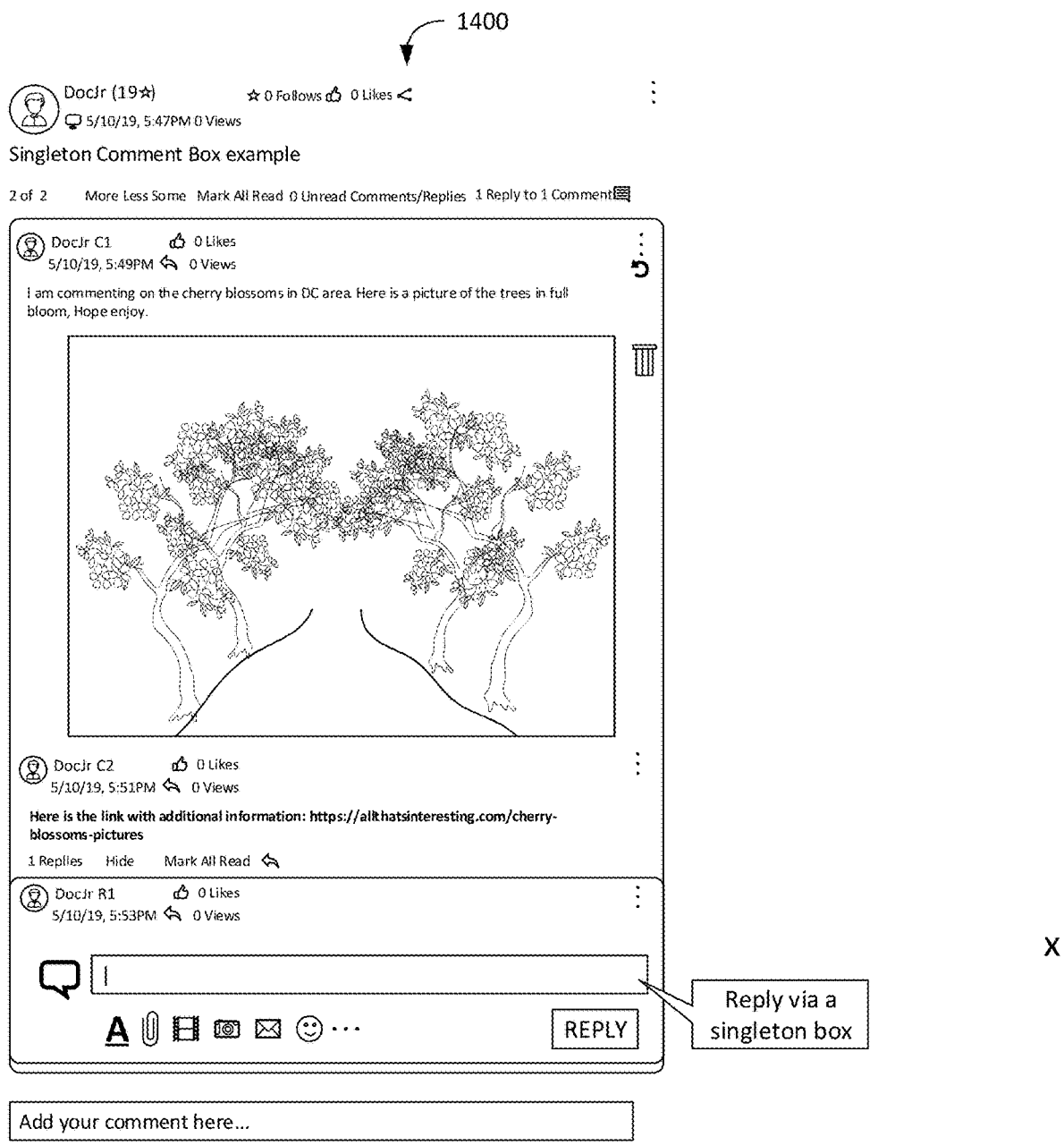
FIG. 14 is a Singleton Compose Box user interface related to a collaboration platform showing a reply option, in accordance with exemplary embodiments.
Figure 15:
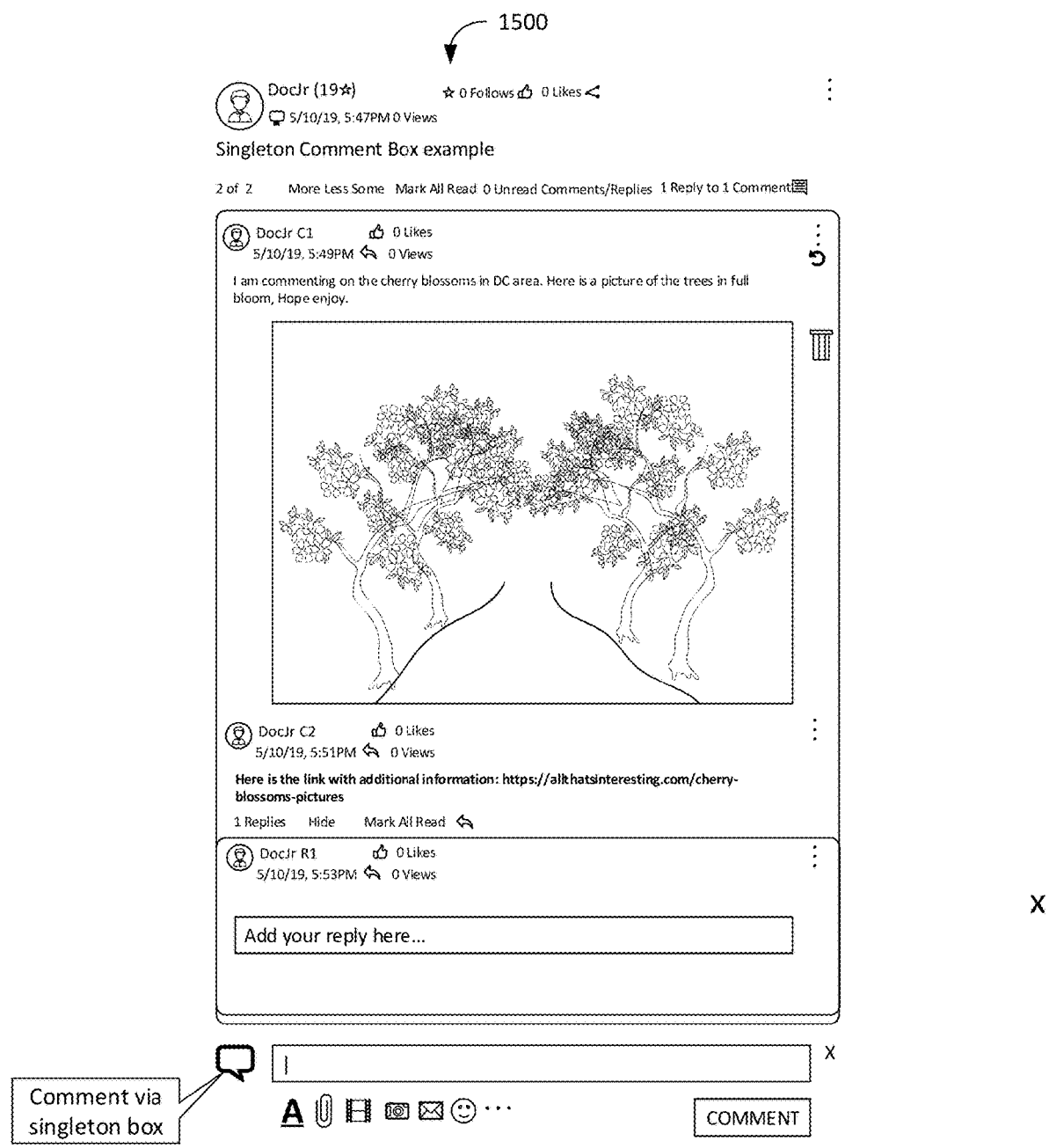
FIG. 15 is a Singleton Compose Box user interface related to a collaboration platform showing a comment option, in accordance with exemplary embodiments.

FIG. 14 is a Singleton Compose Box user interface 1400 related to a collaboration platform showing a reply option, in accordance with exemplary embodiments. FIG. 15 is a Singleton Compose Box user interface 1500 related to a collaboration platform showing a comment option, in accordance with exemplary embodiments. There may be only one instance of the compose box which moves to the point of content creation (Comment/Reply) resulting in efficient and contextual content creation.

Conversation scopes put a user in control of the frequency and the volume of updates they receive. There are 4 conversation scopes.

Figure 16:
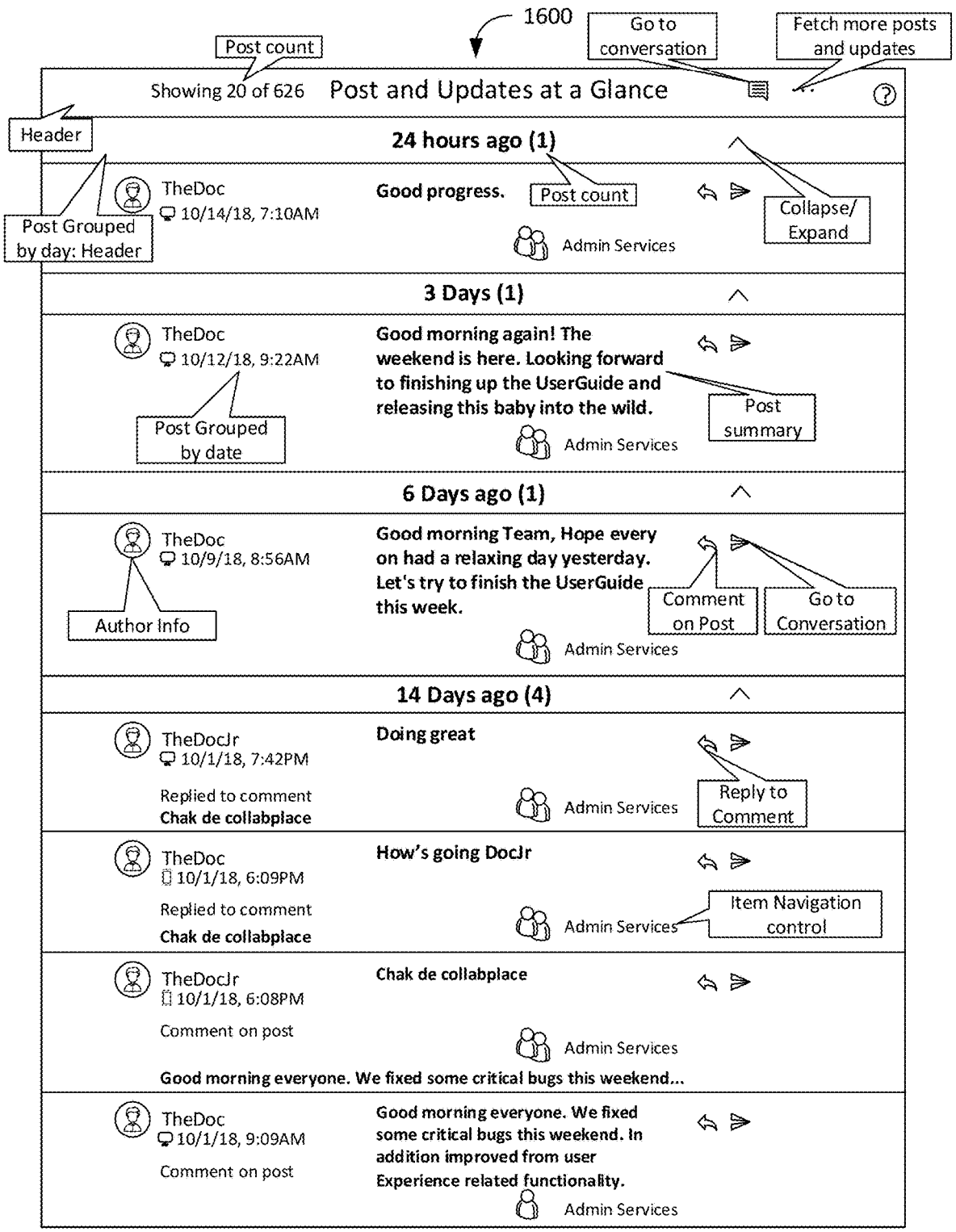
FIG. 16 is an At-A-Glance (AAG) View user interface related to a collaboration platform, in accordance with exemplary embodiments.

FIG. 16 is an At-A-Glance (AAG) View user interface 1600 related to a collaboration platform, in accordance with exemplary embodiments. The AAG View user interface 1600 gives a quick overview of all updates for a user as they come and, in the order, they come in. This may be extremely helpful for getting a very quick overview of what is going on in the activity feed that a user is interested in. The unread posts in this view are color-coded with a blue background to make them prominent. Once a post may be marked as 'Read', the background changes to white.

1. Header: Contains Summary information and controls described below.
   a. Post Count: Shows the number of currently displayed posts and total posts
   b. Go to Conversation Control: Allows the user to navigate to the Conversation view where they can create posts and add comments and replies.
   c. Fetch More Posts Control: By default, the AAG view only displays 10 most recent posts. This control allows the user to fetch older posts.
2. Post Group (by Day) Header: The posts in the AAG are grouped by the date they were created on.
   a. Post count: Number of posts created on a particular date
   b. Show/Hide Control: Allows the user to show/hide posts for a particular date to more easily review posts for a greater number of days.
3. Post Entry: Each entry within the AAG displays summary information about the post. Different pieces of information in this summary are described below
   a. Author Info: Consists of author image and name Hovering over the author image displays detailed information about the user.
   b. Quick Reply: Allows users to quickly reply to a particular post without leaving the AAG view.
   c. Go to Detail Control: Allows the user to navigate to the detailed conversation the post is part of.
   d. Item Navigation Control: Allows the user to navigate to the detail view for Item (Collaboration, Project, Task, Issue, and Event) this post may be related to.

Figure 17:
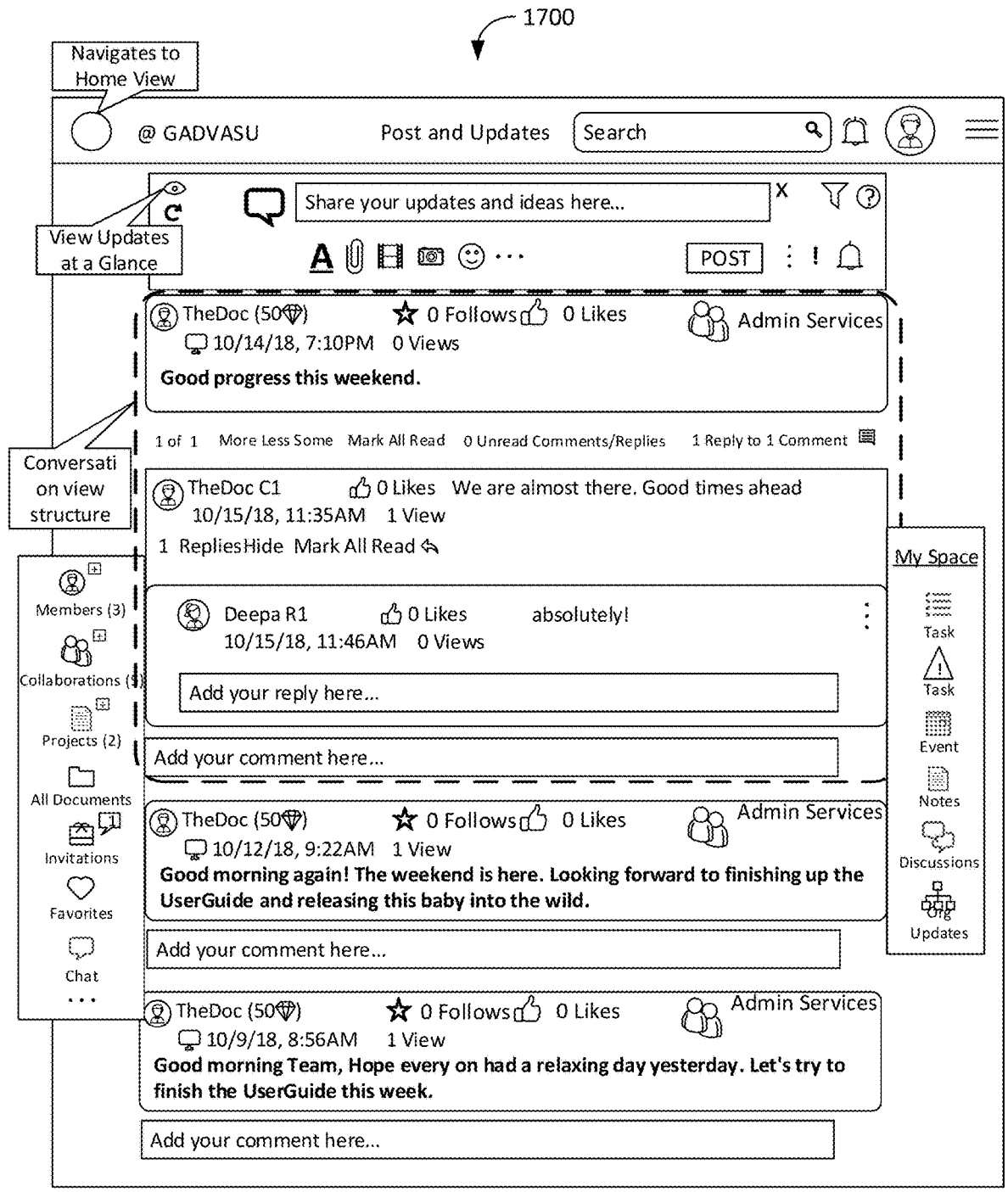
FIG. 17 is an All Updates View user interface related to a collaboration platform, in accordance with exemplary embodiments.
Figure 18:
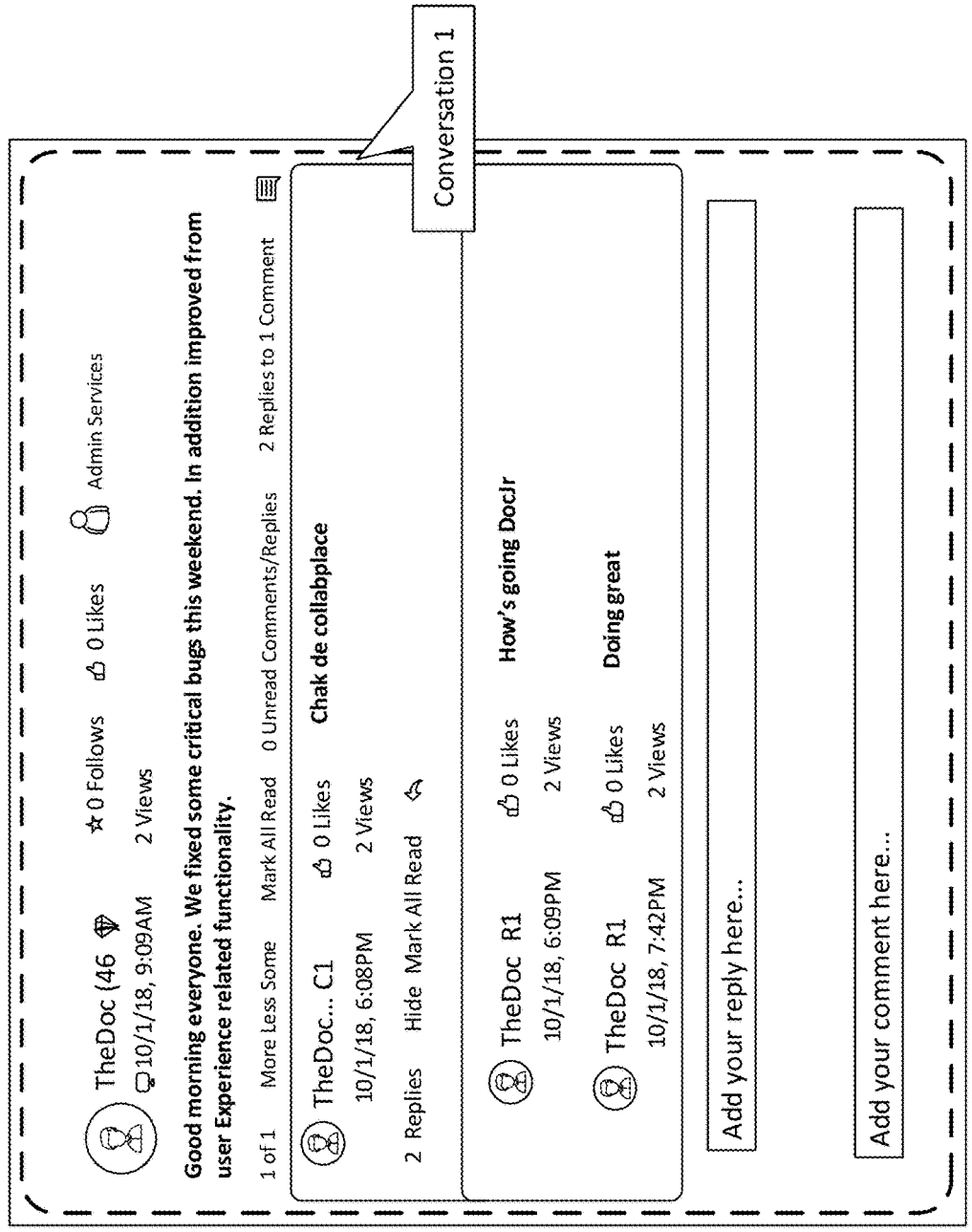
FIG. 18 is an All Updates View user interface related to a collaboration platform, in accordance with exemplary embodiments.
Figure 19:
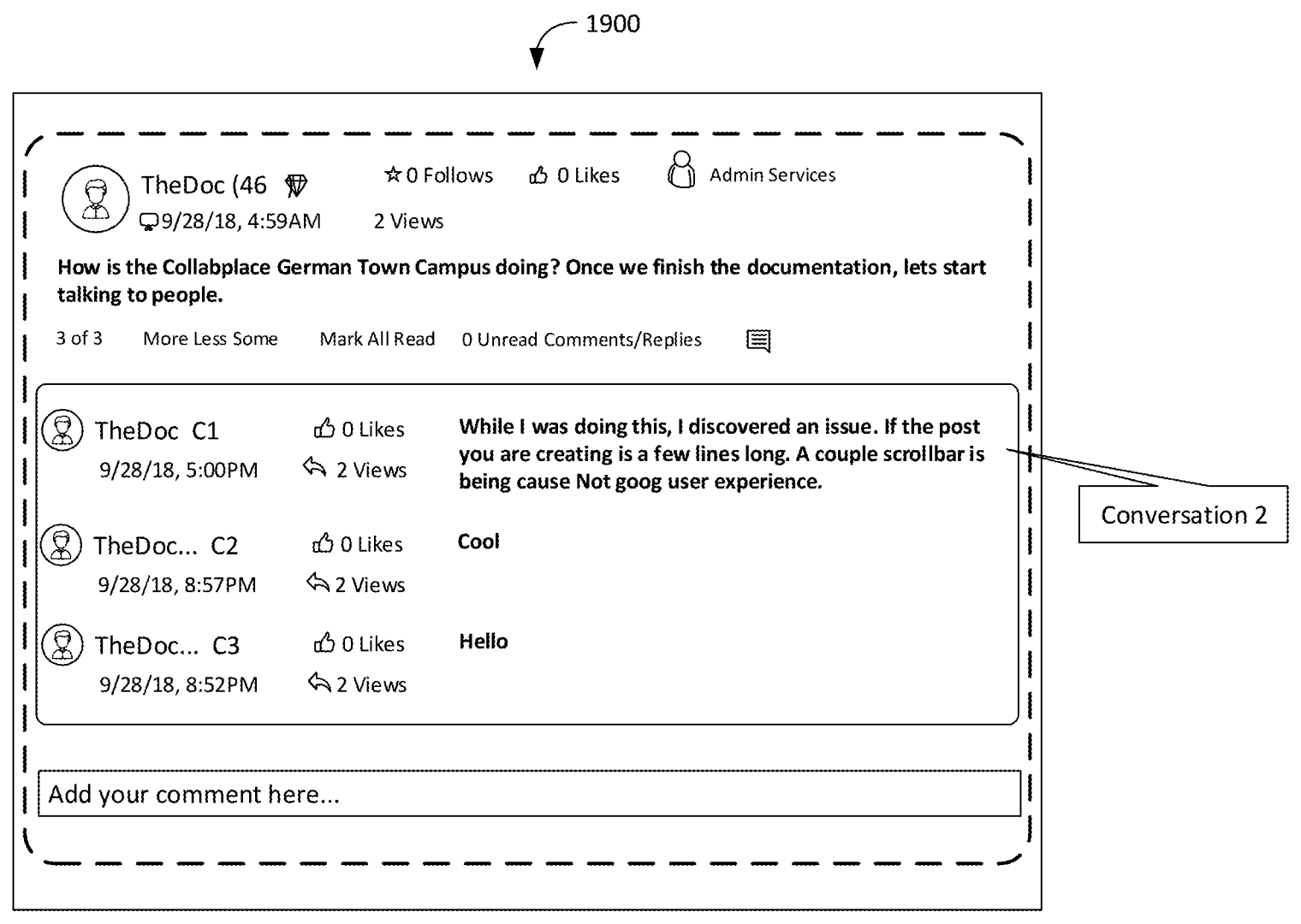

FIG. 17 is an All Updates View user interface 1700 related to a collaboration platform, in accordance with exemplary embodiments. FIG. 18 is an All Updates View user interface 1800 related to a collaboration platform, in accordance with exemplary embodiments. FIG. 19 is an All Updates View user interface 1900 related to a collaboration platform, in accordance with exemplary embodiments.

The All Updates View user interface gives a quick overview of all updates for a user as they come in and the order they come. This is very helpful for getting a very quick overview of what is going on in the activity feed that the user is interested in. However, the updates displayed in AAG lack the conversational structure that may be so vital to having a meaningful dialog about matters that often

- are more complex than what can be described in a simple post/comment/reply
- contain information that is persistent and useful over a long period of time and must often be referred to from other pieces of information
- require the participation of multiple people with back and forth conversation.
- are enhanced by including multimedia aids such as pictures, videos, and other kinds of documents.

All this is made possible by the Conversation/All updates view. For this reason, the conversation view is the Home View for all users as this is where all the collaborative dialog happens. If at any time a quick overview of recent activity is desired, it is always accessible via a conveniently placed link to the AAG (eye icon). By clicking the CP logo from anywhere within CollabPlace, the user can navigate to the following Conversation View (aka Home View) of the Posts and Updates page. The Conversation View has a well-defined structure which is described below.

FIG. 20 is a Topic Conversations View user interface 2000 related to a collaboration platform, in accordance with exemplary embodiments. The Topic Conversations View displays updates that are specific to an item: (Collaboration/Project/User).

Figure 22:
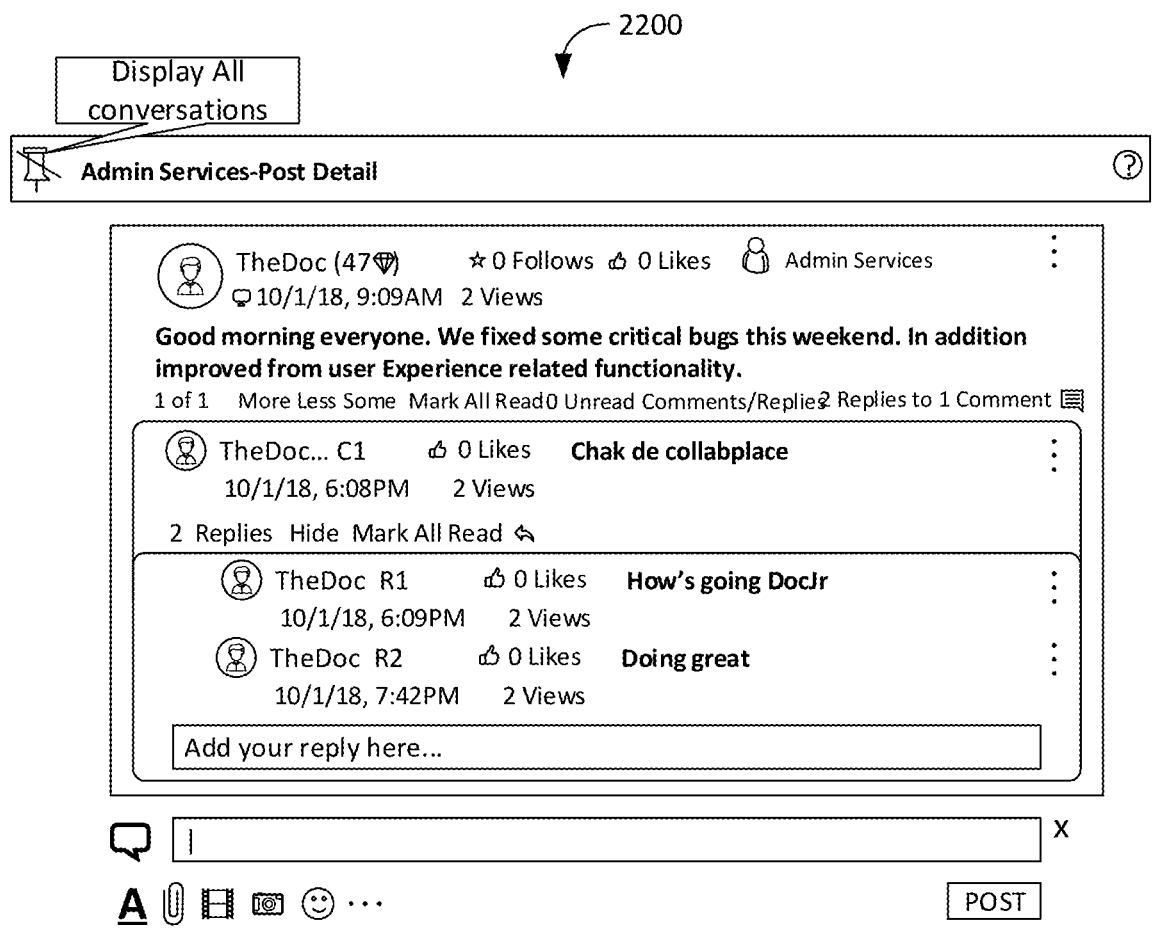
FIG. 22 is a Conversation Detail View user interface related to a collaboration platform, in accordance with exemplary embodiments.

FIG. 21 is a Conversation Detail View user interface 2100 related to a collaboration platform, in accordance with exemplary embodiments. FIG. 22 is a Conversation Detail View user interface 2200 related to a collaboration platform, in accordance with exemplary embodiments. The Conversation Detail View differs from the All and Item Conversation Views in structure as well as scope. This view displays updates that are specific to one conversation. Every conversation in All and Item Conversations views has control to navigate to the Single conversation view.

Figure 23:
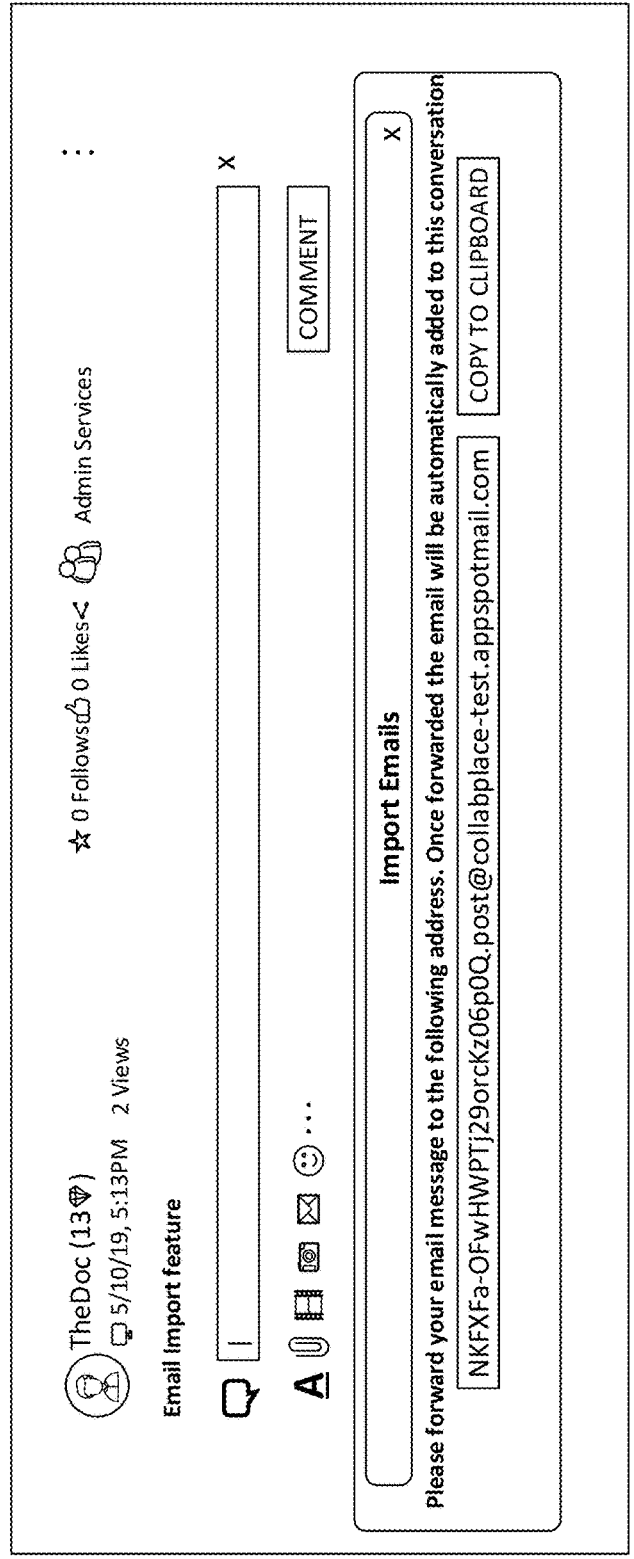
FIG. 23 is a Contextual Email Import user interface related to a collaboration platform, in accordance with exemplary embodiments.

FIG. 23 is a Contextual Email Import user interface 2300 related to a collaboration platform, in accordance with exemplary embodiments. FIG. 24 is a Contextual Email Import user interface 2400 related to a collaboration platform, in accordance with exemplary embodiments. Email import allows integration of email information into a conversation in a contextual manner.

FIG. 25 is a Contextual Document Management user interface 2500 related to a collaboration platform, in accordance with exemplary embodiments. The Contextual Document Management user interface 2500 shows how members of a team with Full access level for the item can upload documents, organize the uploaded documents into folders including moving documents between folders by dragging and dropping, and modify documents.

After a document has been uploaded into CollabPlace it is automatically version controlled. Before a document can be modified it must be checked out and downloaded. A document that has been checked out is labeled as such and cannot be checked out until it is checked in either by uploading the modified version or canceling the checkout. Most document types can be previewed within CollabPlace. However, documents must be edited outside of CollabPlace by checking them out to prevent simultaneous modification by multiple users. The documents can also be deleted by any team member. When a document is deleted it is moved to an area called Attic. To permanently delete a document, it must be deleted from the Attic. Any documents in the Attic can also be restored and become normal documents. The documents can also be Tagged. The document Tags are small pieces of text that can be used to group documents across folders and even across teams. In addition, a document has the following information:

Version History: is a chronological log of version changes document has undergone.

Activity History: is a chronological log of actions performed on the document.

Notes: document notes are short pieces of text that can be quickly added by team members to add extra information to a document.

Discussion: A document can also be discussed in a full contextual conversation among team members.

Sharing: A document can be made available for sharing across teams. Shareable documents can be made available to other teams by attaching them to a post.

Organizational hierarchies are created and managed by organization administrators. Organization management functionality is built into the CollabPlace and is easily available via the Manage Organization control located to the right of the CollabPlace logo and indicated by the presence of an @ character followed by the organization name. Manage organization functionality is described below.

Figure 26:
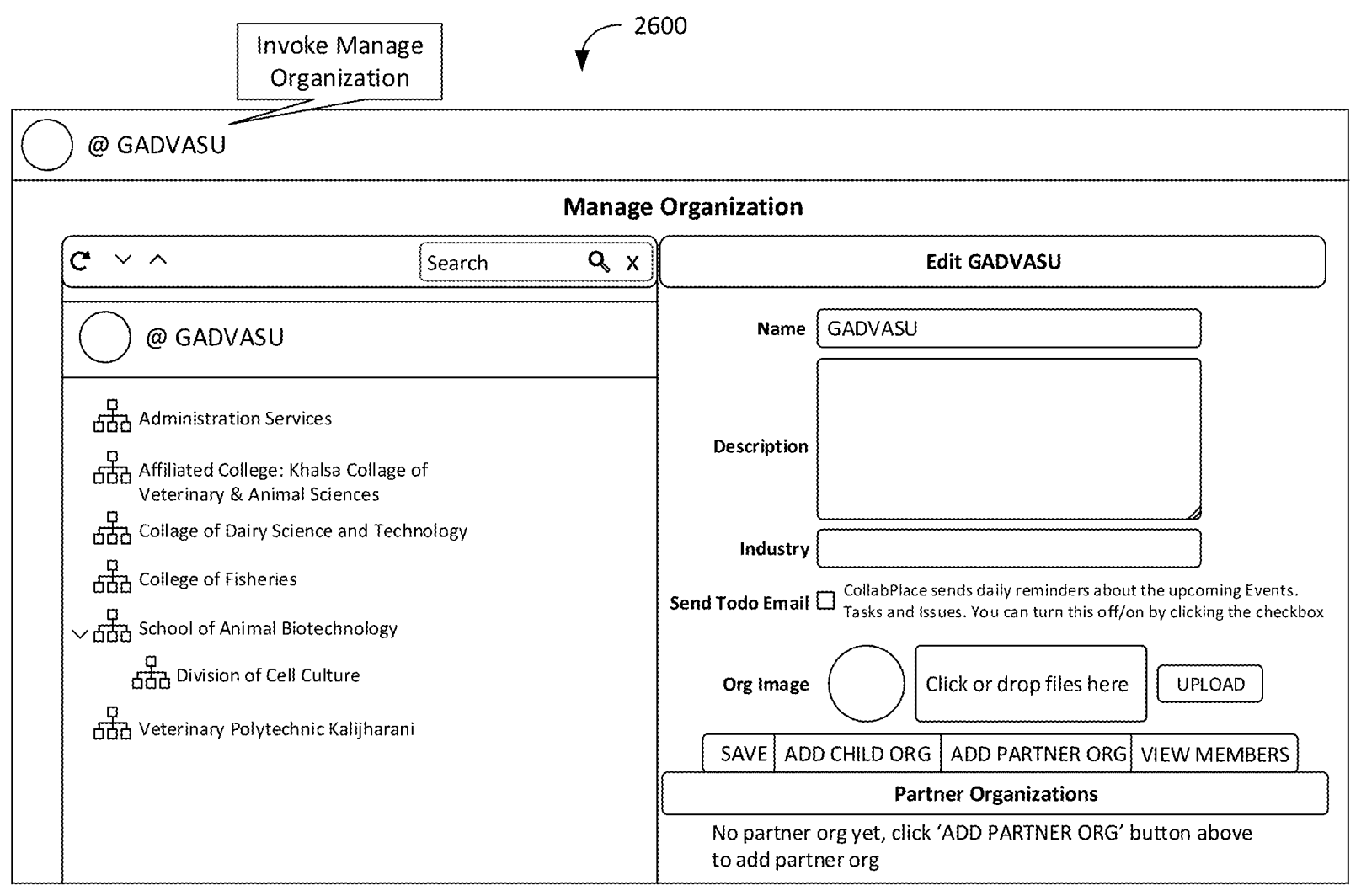

FIG. 26 is a Manage organization view user interface 2600 related to a collaboration platform, in accordance with exemplary embodiments. The Manage organization view user interface 2600 is divided into 2 vertical areas with the left side showing the hierarchical structure and the right-side area showing the details of the currently selected organization.

Left-hand view: The organizations included in the hierarchical view is controlled by a user's permissions. An administrator for a given organization sees and is able to manage the organization and all subordinate organizations. Clicking on an organization displays the details of that organization in the right-hand view. If a user only has access to manage a single organization, the left-hand view is not displayed.

Right-hand view: This view displays details of an organization selected in the left-hand view. The organization details contain controls to modify organization information, view organization members, add a child organization, and add a partner organization. A list of current partner organizations is also displayed in this view.

FIG. 27 is a Manage Organization Members view user interface 2700 related to a collaboration platform, in accordance with exemplary embodiments. Members of an organization are managed by the organization administrator using the View Members button. The Manage Organization Members view contains controls to Invite Members and View Pending Member Invitations. It also contains a list of current members that is searchable and sortable using various member attributes. Each entry in the member list also has controls to change the admin permissions and the activation status for a member. This view is also accessible via the Members option on the left navigation on the landing page.

Figure 28:
FIG. 28 is an Invite Members user interface related to a collaboration platform, in accordance with exemplary embodiments.

FIG. 28 is an Invite Members user interface 2800 related to a collaboration platform, in accordance with exemplary embodiments. The Invite Members user interface 2800 is launched by clicking the Invite Members button in the Members view. The invite members view looks similar to the Manage Organization view with the left-hand side showing the organizational hierarchy and the right-hand side showing controls to invite members into the currently selected organization in the left-hand view.

Left-hand view: This view behaves similar to the Manage Organization left-hand view but instead of showing the organization details in the right-hand view, it shows controls to invite members.

Right-hand view: This view consists of a list of email text boxes to input user email and a button to invite the people identified by their email in the text boxes. Each of the email text boxes also contains a checkbox to specify the invited person to automatically be an administrator on completion of signup.

FIG. 29 is a Pending Invitations user interface 2900 related to a collaboration platform, in accordance with exemplary embodiments. This view allows administrators to view and manage invitations for users who have not yet completed the signup process. This view contains a list of invitations and each entry in the list has controls to Resend and Delete an invitation.

Figure 30:
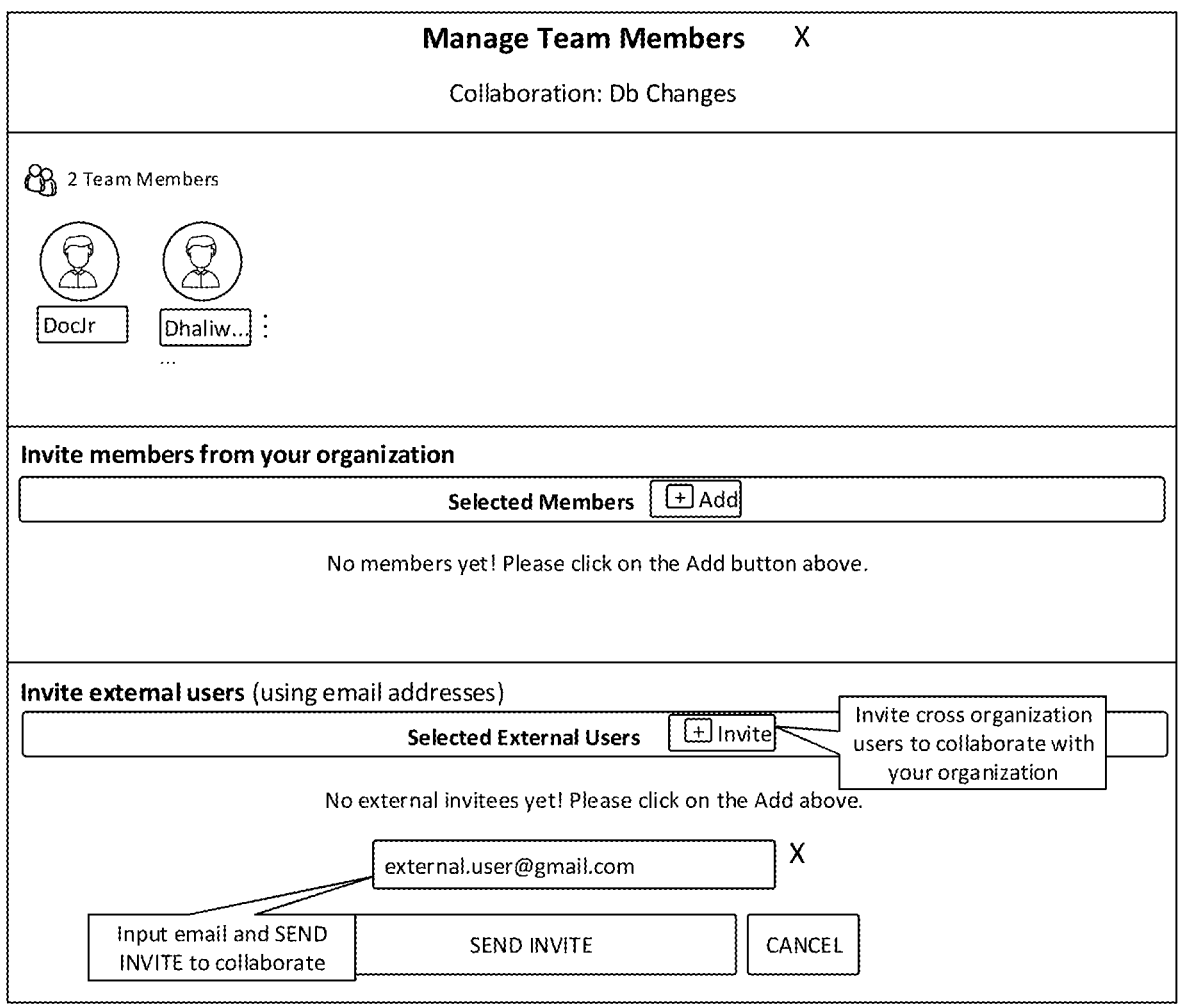
FIG. 30 is a Cross Organization Teams user interface related to a collaboration platform, in accordance with exemplary embodiments.

FIG. 30 is a Cross Organization Teams user interface 3000 related to a collaboration platform, in accordance with exemplary embodiments. The team management allows the user to add members to the team, remove members from the team, and invite external users (the users who do not have CollabPlace accounts) by using their emails.

The present disclosure is related to one or more aspects listed below:

Aspect 1: A "Web Only" collaboration platform with well-defined, structured, and linked conversations delivered consistently across various presentation media including phone, tablet, and desktop has the potential to revolutionize business collaboration.

Aspect 2: Real-time and temporally persistent conversations are needed in order for a collaboration platform to be effective in the business workplace.

Aspect 3: Distraction-free content creation as well as a timely display of received updates is critical for effective, efficient, and thoughtful content creation that is so essential in a business collaboration web environment.

Aspect 4: The Queuing, Notification, and Peeking mechanism developed by this invention afford users an opportunity to create content without being disturbed while at the same time allowing them to receive updates from other users in real-time and in a timely fashion.

Aspect 5: Scoping of information presented to a user in a business collaboration environment is essential to allow users to control updates presented to them at a given time.

Aspect 6: The granular synchronized information presentation mechanism developed by this invention makes this scoped viewing of information by a user possible.

Aspect 7: Ability for a user to perform various actions during a conversation which makes the conversation action-oriented and the action performance contextual is essential for effortless collaboration.

Aspect 8: A arbitrarily scalable, structured, multimedia-rich, context-aware, and distraction-free web content creation mechanism is needed to allow effortless, engaging, and efficient business collaboration.

Aspect 9: The "Singleton Multimedia Floating Compose Box" developed by this invention meets these needs by taking advantage of the standard web browser technology.

Aspect 10: Business information sharing via email and a modern web-based collaboration platform can coexist and should be used in a synergistic manner.

Aspect 11: To allow this synergy to happen and be successful, a mechanism is provided that allows effortless, contextual, gradual, incremental, continuous, and on-demand merging of email information into a business conversation.

Aspect 12: Current document sharing mechanisms requiring custom software installation and local document storage pose security and availability risks for shared documents.

Aspect 13: A "Web Browser Only" contextual and collaborative document sharing platform developed by this invention not only avoids these issues but also facilitates effective and efficient document creation and maintenance essential in a business environment where intellectual content must be created through shared understanding and rigorous dialog.

Aspect 14: Creation of hierarchical organization structure in a collaboration platform is essential for the efficient and secure flow of and access to the shared information.

Aspect 15: Creating partner relationships between organizational units of a hierarchical organization allows cross-unit collaboration by making users from a partner organizational unit available for team formation.

Aspect 16: An effortless, seamless, and secure mechanism is required to allow cross-organizational collaboration to model real-world performance of joint projects by separate organizations.

Figure 31:
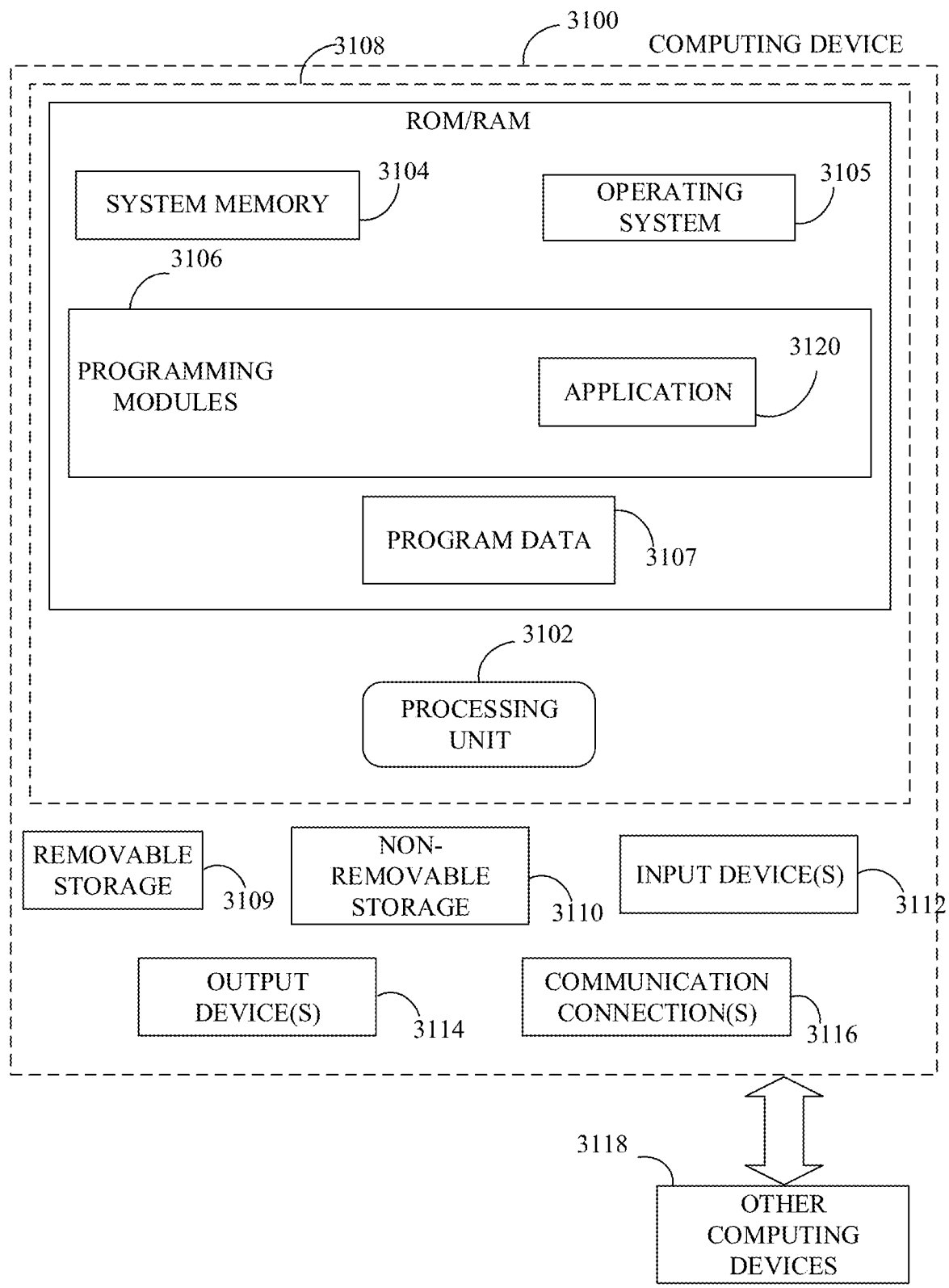
FIG. 31 is a block diagram of a computing device for implementing the methods disclosed herein, in accordance with some embodiments.

With reference to FIG. 31, a system consistent with an embodiment of the disclosure may include a computing device or cloud service, such as computing device 3100. In a basic configuration, computing device 3100 may include at least one processing unit 3102 and a system memory 3104. Depending on the configuration and type of computing device, system memory 3104 may comprise, but is not limited to, volatile (e.g. random-access memory (RAM)), non-volatile (e.g. read-only memory (ROM)), flash memory, or any combination. System memory 3104 may include operating system 3105, one or more programming modules 3106, and may include a program data 3107. Operating system 3105, for example, may be suitable for controlling computing device 3100's operation. In one embodiment, programming modules 3106 may include the image-processing module, machine learning module. Furthermore, embodiments of the disclosure may be practiced in conjunction with a graphics library, other operating systems, or any other application program and is not limited to any particular application or system. This basic configuration is illustrated in FIG. 31 by those components within a dashed line 3108.

Computing device 3100 may have additional features or functionality. For example, the computing device 3100 may also include additional data storage devices (removable and/or non-removable) such as, for example, magnetic disks, optical disks, or tape. Such additional storage is illustrated in FIG. 31 by a removable storage 3109 and a non-removable storage 3110. Computer storage media may include volatile and non-volatile, removable and non-removable media implemented in any method or technology for storage of information, such as computer-readable instructions, data structures, program modules, or other data. System memory 3104, removable storage 3109, and non-removable storage 3110 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 3100. Any such computer storage media may be part of device 3100. Computing device 3100 may also have input device(s) 3112 such as a keyboard, a mouse, a pen, a sound input device, a touch input device, a location sensor, a camera, a biometric sensor, etc. Output device(s) 3114 such as a display, speakers, a printer, etc. may also be included. The aforementioned devices are examples and others may be used.

Computing device 3100 may also contain a communication connection 3116 that may allow device 3100 to communicate with other computing devices 3118, such as over a network in a distributed computing environment, for example, an intranet or the Internet. Communication connection 3116 is one example of communication media. Communication media may typically be embodied by computer-readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer-readable media as used herein may include both storage media and communication media.

As stated above, a number of program modules and data files may be stored in system memory 3104, including operating system 3105. While executing on processing unit 3102, programming modules 3106 (e.g., application 3120 such as a media player) may perform processes including, for example, one or more stages of methods, algorithms, systems, applications, servers, databases as described above. The aforementioned process is an example, and processing unit 3102 may perform other processes.

Generally, consistent with embodiments of the disclosure, program modules may include routines, programs, components, data structures, and other types of structures that may perform particular tasks or that may implement particular abstract data types. Moreover, embodiments of the disclosure may be practiced with other computer system configurations, including hand-held devices, general-purpose graphics processor-based systems, multiprocessor systems, microprocessor-based or programmable consumer electronics, application-specific integrated circuit-based electronics, minicomputers, mainframe computers, and the like. Embodiments of the disclosure may also be practiced in distributed computing environments where tasks are performed by remote processing devices that are linked through a communications network. In a distributed computing environment, program modules may be located in both local and remote memory storage devices.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performance logical operations such as, for example, AND, OR, and NOT, including but not limited to mechanical, optical, fluidic, and quantum technologies. In addition, embodiments of the disclosure may be practiced within a general-purpose computer or in any other circuits or systems.

Embodiments of the disclosure, for example, may be implemented as a computer process (method), a computing system, or as an article of manufacture, such as a computer program product or computer-readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example, but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random-access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, solid-state storage (e.g., USB drive), or a CD-ROM, a carrier wave from the Internet, or other forms of RAM or ROM. Further, the disclosed methods' stages may be modified in any manner, including by reordering stages and/or inserting or deleting stages, without departing from the disclosure.

Although the present disclosure has been explained in relation to its preferred embodiment, it is to be understood that many other possible modifications and variations can be made without departing from the spirit and scope of the disclosure.

The following is claimed:

1. A collaboration platform for facilitating conversations between users, the collaboration platform comprising:
   a communication device configured for:
   transmitting a content creating interface to a plurality of user devices associated with a plurality of users;
   receiving at least one content information through the content creating interface from at least one user device of the plurality of user devices;
   receiving user information associated with a user of the plurality of users from a user device of the plurality of user devices; and
   transmitting at least one of an update and at least one conversational content corresponding to the update to the user device of the plurality of user devices;
   a processing device configured for:
   generating the at least one conversational content associated with at least one context based on the at least one content information, wherein the at least one context comprises at least one of a collaboration group, a collaboration task, a collaboration issue, and a collaboration document;
   generating at least one update corresponding to the at least one conversational content;
   analyzing the user information;
   determining a conversation scope associated with the user based on the analyzing;
   identifying the update of the at least one update based on the determining;
   analyzing the at least one content information;
   determining at least one content status based on the analyzing of the at least one content information, identifying a user device of the plurality of user devices based on the at least one content status, wherein the communication device is further configured for transmitting the at least one update to the user device of the plurality of user devices, wherein the user device is configured for presenting the at least one update, wherein the presenting of the at least one update interrupts the receiving of the at least one content information, creating an update queue based on the determining of the at least one content status, wherein the update queue comprises the at least one update;
   generating at least one notification based on the creating, wherein the communication device is further configured for transmitting the at least one notification to the user device of the plurality of user devices, wherein the user device is configured for presenting the at least one notification, wherein the presenting of the at least one notification does not interrupt the receiving of the at least one content information; and
   a storage device configured for storing the at least one conversational content.

2. The collaboration platform of claim 1, wherein the content creating interface comprises a singleton compose box user interface, wherein the singleton compose box user interface comprises at least one control, wherein the at least one control facilitates creating of the at least one conversational content, wherein the at least one conversational content is structured and scalable.

3. The collaboration platform of claim 1, wherein the processing device is further configured for structuring the at least one conversational content in at least one structure, wherein the at least one structure is temporally persistent.

4. The collaboration platform of claim 1, wherein the at least one conversational content comprises at least one previous conversational content and at least one current conversational content, wherein each of the at least one previous conversational content and the at least one current conversational content is associated with at least one context, wherein the communication device is further configured for receiving at least one indication associated with at least one of the at least one previous conversational content and the at least one current conversational content from the user device, wherein the processing device is further configured for linking the at least one current conversational content with the at least one previous conversational content based on the at least one indication.

5. The collaboration platform of claim 1, wherein the communication device is further configured for:
   receiving at least one device status of the plurality of user devices from at least one device sensor, wherein the at least one device sensor is configured for generating the at least one device status based on at least one status of the plurality of user devices; and
   transmitting the at least one conversational content to the plurality of user devices based on at least one sharing manner, wherein the processing device is further configured for identifying the at least one sharing manner corresponding to the at least one conversational content based on the at least one device status.

6. The collaboration platform of claim 5, wherein the at least one sharing manner comprises a real-time manner and a temporally persistent manner, wherein the at least one conversational content is consistent for at least one of the real-time manner and the temporally persistent manner.

7. The collaboration platform of claim 5, wherein the plurality of user devices is communicatively connectable to the communication device over at least one communication channel, wherein the at least one status comprises an online state and an offline state, wherein each user device of the plurality of user devices transitions between the online state and the offline state, wherein a user device of the plurality of user devices is not communicatively connected to the communication device in the offline state, wherein a user device of the plurality of user devices is communicatively connected to the communication device in the online state.

8. The collaboration platform of claim 1, wherein the processing device is further configured for:
   analyzing the at least one content information;
   determining at least one content status based on the analyzing of the at least one content information, and
   identifying a user device of the plurality of user devices based on the at least one content status, wherein the communication device is further configured for transmitting the at least one update to the user device of the plurality of user devices, wherein the user device is configured for presenting the at least one update, wherein the presenting of the at least one update interrupts the receiving of the at least one content information.

9. A collaboration platform for facilitating conversations between users, the collaboration platform comprising:
   a communication device configured for:
   transmitting a content creating interface to a plurality of user devices associated with a plurality of users;
   receiving at least one content information through the content creating interface from at least one user device of the plurality of user devices;
   receiving user information associated with a user of the plurality of users from a user device of the plurality of user devices; and transmitting at least one of an update and at least one conversational content corresponding to the update to the user device of the plurality of user devices;

a processing device configured for:

generating the at least one conversational content associated with at least one context based on the at least one content information, wherein the at least one context comprises at least one of a collaboration group, a collaboration task, a collaboration issue, and a collaboration document;

generating at least one update corresponding to the at least one conversational content;

analyzing the user information;

determining a conversation scope associated with the user based on the analyzing;

identifying the update of the at least one update based on the determining;

analyzing the at least one content information;

determining at least one content status based on the analyzing of the at least one content information, and identifying a user device of the plurality of user devices based on the at least one content status, wherein the communication device is further configured for transmitting the at least one update to the user device of the plurality of user devices, wherein the user device is configured for presenting the at least one update, wherein the presenting of the at least one update interrupts the receiving of the at least one content information;

creating an update queue based on the determining of the at least one content status, wherein the update queue comprises the at least one update; and generating at least one notification based on the creating, wherein the communication device is further configured for transmitting the at least one notification to the user device of the plurality of user devices, wherein the user device is configured for presenting the at least one notification, wherein the presenting of the at least one notification does not interrupt the receiving of the at least one content information; and a storage device configured for storing the at least one conversational content;

the device further configured for analyzing the at least one content information.

10. The collaboration platform of claim 1, wherein the communication device is further configured for:

transmitting a conversation user interface to the plurality of user devices, wherein the conversation user interface comprises at least one posting option control associated with the at least one conversational content;

receiving at least one posting option control indication corresponding to the at least one posting option control through the conversation user interface from the at least one user device; and transmitting at least one of a discussion, a task, an issue, and an event to the plurality of user devices, wherein the processing device is further configured for:

identifying the at least one posting option control based on the at least one posting option control indication;

performing at least one action on the at least one conversational content based on the at least one posting option control; and converting the at least one conversational content to the at least one of the discussion, the task, the issue, and the event based on the performing.

11. The collaboration platform of claim 9, wherein the at least one conversational content forms at least one conversation, wherein the communication device is further configured for:

receiving at least one inserting point indication from the at least one user device;

transmitting a one-time use email ID to the at least one user device; and receiving an email associated with the one-time-use email ID from an external device, wherein the email is associated with the at least one context, wherein the processing device is further configured for:

identifying at least one inserting point in the at least one conversation based on the at least one inserting point indication;

generating the one-time-use email ID based on the identifying of the at least one inserting point;

processing at least one email information of the email; and integrating the at least one email information in the at least one conversation based on the processing.

12. The collaboration platform of claim 9, wherein the communication device is further configured for:

receiving at least one document from the at least one user device;

transmitting the at least one document to the plurality of user devices;

receiving at least one additional information corresponding to the at least one document from a user device of the plurality of user devices; and transmitting at least one new document to the plurality of user devices, wherein the processing device is further configured for:

performing at least one action on the at least one document based on the at least one additional information;

generating the at least one new document based on the performing; and generating at least one notification based on the performing, wherein the at least one notification comprises a time-stamp, wherein the storage device is further configured for storing the at least one notification, wherein the storage device does not store the at least one document and the at least one new document.

13. The collaboration platform of claim 9, wherein the communication device is further configured for;

receiving a plurality of information from the plurality of user devices, wherein the processing device is further configured for:

analyzing the plurality of information;

generating at least one organizational unit associated with at least one organization based on the analyzing, wherein the at least one organizational unit is associated with at least one hierarchical level of an organizational hierarchy, wherein the at least one organizational unit comprises at least one user, wherein the at least one user is associated with the at least one user device; and forming at least one team based on the generating, wherein the at least one team comprises the at least one user of the at least one organizational unit, wherein the at least one user is associated with the at least one hierarchical level.

14. The collaboration platform of claim 13, wherein the at least one organization comprises a first organization and a second organization, wherein the at least one organizational unit comprises a first organizational unit and a second organizational unit, wherein the first organizational unit is associated with the first organization and the second organizational unit is associated with the second organization.

15. The collaboration platform of claim 14, wherein the at least one team comprises at least one first user of the first organizational unit and at least one second user of the second organizational unit, wherein the at least one first user is associated with at least one first hierarchical level of the organizational hierarchy and the at least one second user is associated with at least one second hierarchical level of the organizational hierarchy.

16. The collaboration platform of claim 13, wherein the at least one organizational unit comprises a plurality of organizational units associated with a plurality of hierarchical levels, wherein the plurality of organizational units comprises the plurality of users associated with the plurality of user devices, wherein the communication device is further configured for:
   receiving data from a user device of the plurality of user devices associated with a user of the plurality of users, wherein the user is associated with an organizational unit of the plurality of organizational units, wherein the organizational unit is associated with a hierarchical level of the plurality of hierarchical levels; and
   transmitting the data to at least one subordinate user device of the plurality of user devices associated with at least one subordinate user of the plurality of users, wherein the at least one subordinate user is associated with at least one lower organizational unit of the plurality of organizational units, wherein the processing device is further configured for:
   comparing the plurality of hierarchical levels associated with the plurality of organizational units with the hierarchical level of the organizational unit; and
   identifying the at least one lower organizational unit of the plurality of organizational units based on the comparing, wherein the at least one lower organizational unit is associated with the at least one lower hierarchical level of the plurality of hierarchical levels, wherein the at least one lower organizational unit comprises the at least one subordinate user of the plurality of users, wherein the at least one subordinate user is associated with the at least one subordinate user device of the plurality of user devices, wherein at least one position of the at least one lower hierarchical level is lower in the organizational hierarchy than a position of the hierarchical level in the organizational hierarchy.

17. The collaboration platform of claim 1, wherein the processing device is further configured for determining at least one collaboration of the user of the plurality of users based on the analyzing of the user information, wherein the identifying of the update of the at least one update is based on the at least one collaboration.

* * * * *